United States Patent
Galvanauskas

(10) Patent No.: US 9,503,196 B2
(45) Date of Patent: Nov. 22, 2016

(54) N² TIMES PULSE ENERGY ENHANCEMENT USING COHERENT ADDITION OF N ORTHOGONALLY PHASE MODULATED PERIODIC SIGNALS

(71) Applicant: THE REGENTS OF THE UNIVERSITY OF MICHIGAN, Ann Arbor, MI (US)

(72) Inventor: Almantas Galvanauskas, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 42 days.

(21) Appl. No.: 14/403,038

(22) PCT Filed: Jun. 11, 2013

(86) PCT No.: PCT/US2013/045097
§ 371 (c)(1),
(2) Date: Nov. 21, 2014

(87) PCT Pub. No.: WO2013/188349
PCT Pub. Date: Dec. 19, 2013

(65) Prior Publication Data
US 2015/0086217 A1    Mar. 26, 2015

Related U.S. Application Data

(60) Provisional application No. 61/658,150, filed on Jun. 11, 2012.

(51) Int. Cl.
*H04B 10/04*    (2006.01)
*H04B 10/564*   (2013.01)
*H01S 3/067*    (2006.01)
(Continued)

(52) U.S. Cl.
CPC ........... *H04B 10/564* (2013.01); *H01S 3/0092* (2013.01); *H01S 3/06754* (2013.01); *H01S 3/1307* (2013.01); *H01S 3/2383* (2013.01);
(Continued)

(58) Field of Classification Search
CPC .......................... H04B 10/564; H04B 10/5561
See application file for complete search history.

(56) References Cited

U.S. PATENT DOCUMENTS 6,708,003 B1 *  3/2004  Wickham ........... H04B 10/1121
                                                      398/102
7,796,326 B1 *  9/2010  Shay ................... H04B 10/1121
                                                      359/349

(Continued)

FOREIGN PATENT DOCUMENTS

JP    2000298297 A    10/2000

OTHER PUBLICATIONS

International Search Report and Written Opinion for PCT/US2013/045097, mailed Feb. 25, 2014; ISA/KR.

*Primary Examiner* — Dzung Tran
(74) *Attorney, Agent, or Firm* — Harness, Dickey & Pierce, PLC

(57) ABSTRACT

A method for increasing energy in a pulse optical beam is provided. The method may include: receiving an optical input beam having a period pulse train with a given repetition frequency; splitting the input beam into N optical signals; phase modulating each signal in the N optical signals at a different phase, such that the N optical signal are orthogonal to each other; and coherently combining each of the phase modulated signals into a single optical output beam.

22 Claims, 24 Drawing Sheets

(51) Int. Cl.
    *H01S 3/13*     (2006.01)
    *H01S 3/23*     (2006.01)
    *H04B 10/556*     (2013.01)
    *H01S 3/00*     (2006.01)

(52) U.S. Cl.
    CPC ......... H04B 10/5561 (2013.01); *H01S 3/0057* (2013.01)

(56) References Cited

U.S. PATENT DOCUMENTS

| | | |
|---|---|---|
| 2005/0232182 A1 | 10/2005 | Shattil |
| 2005/0232317 A1 | 10/2005 | Dantus et al. |
| 2006/0268408 A1* | 11/2006 | Toussaint ............ G02B 27/286 359/489.07 |
| 2007/0280398 A1 | 12/2007 | Dardik et al. |
| 2008/0037028 A1 | 2/2008 | Cheung et al. |
| 2009/0161034 A1 | 6/2009 | Coates et al. |
| 2009/0180778 A1* | 7/2009 | Rhee .................... H04B 10/548 398/79 |
| 2010/0183309 A1* | 7/2010 | Etemad ................ H04B 10/505 398/79 |
| 2010/0315699 A1 | 12/2010 | Wang et al. |
| 2011/0069975 A1 | 3/2011 | Liu et al. |
| 2013/0148128 A1 | 6/2013 | Fermann et al. |

\* cited by examiner

Periodic pulse train $A_{combined}(t)$

N² TIMES PULSE ENERGY ENHANCEMENT USING COHERENT ADDITION OF N ORTHOGONALLY PHASE MODULATED PERIODIC SIGNALS

CROSS-REFERENCE TO RELATED APPLICATIONS

This application is a U.S. National Phase application under 35 U.S.C. 371 of International Application No. PCT/US2013/045097 filed on Jun. 11, 2013 and published in English as WO 2013/188349 A1 on Dec. 19, 2013. This application claims the benefit of U.S. Provisional Application No. 61/658,150, filed on Jun. 11, 2012. The entire disclosures of the above application are incorporated herein by reference.

GOVERNMENT CLAUSE

This invention was made with government support under grant number N00014-07-1-1155 awarded by the Navy/ONR and under grant number N66001-11-1-4208 awarded by the Navy/SPAWAR. The Government has certain rights in this invention.

FIELD

The present disclosure relates to coherently combining multiple laser beams to increase pulse energy.

BACKGROUND

In general, combining beams from multiple lasers overcomes the power limitations of an individual laser. For instance, when combining continuous-wave (CW) laser beams, various methods such as active coherent phasing, spectral combining, passive self-locked combining, and incoherent addition of multiple laser beams have been used. There are various differences between these methods in achieving combined-beam brightness. For example, coherent combining can increase beam brightness, while incoherent combining cannot.

With all known active coherent phasing methods, the beams from the multiple lasers, which are parallel, generate an identical signal, and all parallel output beams are then combined. The total combined power is usually linearly proportional to the total number of combined beams. In particular, the total combined power may not exceed the power of an individual laser in the combined array multiplied the total number of combined beams, assuming each laser provides the same power. Accordingly, in the case of combined continuous-wave signals, the maximum power is limited by the energy/power conservation law.

The same beam combining methods have been applied to overcoming pulse energy limitations of each individual laser. For example, coherent combination of parallel beams of multiple pulsed lasers have been demonstrated. Similar to continuous-wave signal combining, for each of the methods, each pulsed laser produces identical pulsed beams and, therefore, combined pulse energy increases linearly with the number of combined beams. Accordingly, the maximum achievable combined pulse energy may also be limited by the energy extractable from each individual laser multiplied by the number of beams. A combined average power is constrained in a similar manner as power in CW combined systems. Average power being related to the pulse energy $E_{pulse}$ through a pulse repetition rate $f_r$ as $P_{average} = E_{pulse} \cdot f_r$. Pulse repetition rate in these methods is the same for each individual beam and for the combined output.

A different coherent combining approach for generating pulsed output have been proposed and demonstrated. Specifically, a periodic pulsed signal at the input of the system is decomposed (i.e. spectrally separated) into its constituent CW spectral components using a proper spatially-dispersive device, such as diffraction gratings. Each spectral component is then individually amplified in one of the parallel amplifiers with properly controlling the phase of the CW spectral component. Subsequently, a pulsed periodic signal is reconstituted at the system output by recombining all spectral components again into a single beam using a spatially dispersive device, which can be the same as the one used for spectral separation at the input. This approach is based on the theory that each periodic signal A(t) can be represented as Fourier series decomposition provided in equation (1), where each term in the Fourier series is a CW signal of different optical frequency $n\omega_r$, each frequency being an n-th harmonic of the repetition frequency $\omega_r = 2\pi f_r$ of a periodic signal, and $c_n$ is an amplitude of each constituent CW Fourier-series component.

$$A(t) = \sum_{p=-\infty}^{\infty} A_0(t - p\Delta T) = \sum_{n=-\infty}^{\infty} c_n e^{in\omega_r t} \quad (1)$$

The spectral amplitude $c_n$ is calculated using equation (2), where signal period $T_p = 1/f_r$. $A_0(t)$ is a temporal shape of each individual pulse in the periodic sequence. Each n-th CW Fourier-series component (characterized by frequency $n\omega_r$ and amplitude $c_n$) is orthogonal to all the others, and all these components constitute a set of normal modes of propagation (frequency modes).

$$c_n = \frac{1}{2\pi} \int_{-\frac{T_p}{2}}^{\frac{T_p}{2}} A_0(t) e^{-in\omega_r t} dt \quad (2)$$

According to the above described method, the generated pulse energy $E_{pulse}$ at the output is determined by the total combined optical power $P_{N\text{-}channels}$, which is proportional to N-times the power $P_{channel}$ of each CW signal from each parallel amplifier $P_{N\text{-}channels} \sim N \cdot P_{channel}$, divided by the repetition rate $f_r$ of the pulsed signal: $P_{N\text{-}channels}/f_r = E_{pulse}$. In other words, the method is free from pulsed-energy limitations of each parallel amplifier, such as the extractable energy and peak power due, to detrimental nonlinear effects and optical damage.

The main limitation to this method is that the number of parallel beams or channels in such a combined laser array should be equal to the total number $N_{modes}$ of frequency modes $c_n$ in the periodically-pulsed signal. The total number of modes $N_{modes}$ is equal to the ratio between the spectral width $\Delta f$ of the signal (taken as Fourier transform of $A_0(t)$) and the pulse repetition rate $f_r$ (i.e. frequency separation between two adjacent spectral modes $c_n$ and $c_{n-1}$): $N_{modes} = \Delta f/f_r$, or, equivalently, to the ratio between the pulse duration $\Delta t_p$ and pulse repetition period $T_p$: $N_{modes} = \Delta t_p/T_p$.

In practice, achieving high energies would require unacceptably high number of parallel channels. For example, in order to achieve >1 J per pulse for bandwidth-limited pulse durations shorter than $\sim 10^{-9}$ s at $\sim 1$ kW of total combined power would require more than $10^6$ parallel channels, which may not be practical. This required channel number is much larger than in the identical-channel combining schemes described above.

This section provides background information related to the present disclosure which is not necessarily prior art.

SUMMARY

This section provides a general summary of the disclosure, and is not a comprehensive disclosure of its full scope or all of its features.

A method for achieving high pulsed energies from coherently combined laser arrays is provided in the present disclosure. The method may include: receiving an optical input beam having a period pulse train with a given repetition frequency; splitting the input beam into N optical signals; phase modulating each signal in the N optical signals at a different phase, such that the N optical signal are orthogonal to each other; and coherently combining each of the phase modulated signals into a single optical output beam.

In an aspect of the present disclosure, phase modulating may include applying a linear-phase ramp modulating signal to each of the N optical signals. Alternatively, phase modulating may include applying a staircase-shaped phase modulating signal to each of the N optical signals.

In an aspect of the present disclosure, phase modulating may include shifting a frequency of each longitudinal mode in a frequency comb of a given signal, m, in the N optical signals by a spacing equal to $\Delta\omega$ m/N, where $\Delta\omega$ is an angular repetition rate of the period pulse train, m is an integer selected from zero to N−1, and N is the number of optical signals.

In an aspect of the present disclosure phase modulating may include selecting a phase modulation pattern for the N optical signals using a Hadamard matrix.

In an aspect of the present disclosure, the method may further include amplifying each of the phase modulated signals in the N optical signals prior to coherently combining the phase modulated signals. Furthermore, in an aspect of the present disclosure, the method may further include phase locking each signal of the N optical signals prior to amplifying the respective signal, wherein the phase locking is implemented using a phase controller.

In an aspect of the present disclosure, coherently combining may include using a nonlinear optical conversion method. The nonlinear optical conversion method may be selected from one of second-harmonic generation, sum-frequency generation and difference-frequency generation.

In an aspect of the present disclosure the optical input beam may include multiple continuous wave beams having different optical frequencies.

In another aspect, a method for achieving high pulsed energies from coherently combined laser arrays may include: receiving an optical input beam having a period pulse train with a given repetition frequency; splitting the input beam into a plurality of optical signals; phase-modulating each signal in the plurality of optical signals at a different phase, such that the plurality of optical signal are orthogonal to each other; amplifying each of the phase-modulated signals in the plurality of optical signals; and coherently combining each of the plurality of optical signals into a single optical output beam using second-harmonic generation.

In an aspect of the present disclosure, phase modulating may include applying a linear-phase ramp modulating signal having a slope of $2\pi m/N\Delta T$ to each of the plurality of optical signals, where N is the number of optical signals, m is an integer selected from zero to N−1, and T is a reception period of the periodic pulse train.

In an aspect of the present disclosure, phase modulating may include applying a staircase-shaped phase modulating signal to each of the plurality of optical signals.

In an aspect of the present disclosure, phase modulating may include shifting a frequency of each longitudinal mode in a frequency comb of a given signal, m, in the plurality of optical signals by a spacing equal to $\Delta\omega$ m/N, where $\omega$ is an angular repetition rate of the period pulse train, m is an integer selected from zero to N−1, and N is the number of optical signals.

In an aspect of the present disclosure, coherently combining via second-harmonic generation may include: splitting each of the plurality of optical signals into two signals having equal power, thereby forming a respective beam pair; forming an array of optical beams by symmetrically aligning the respective beam pairs around a common center; and directing the array of optical beams towards a nonlinear phase-matched crystal.

In an aspect of the present disclosure, coherently combining via second-harmonic generation may include: arranging the plurality of optical signals in a semi-circular shape to form a semi-optical array input; splitting the semi-optical array input into two beams having equal power; inverting one of the beams in a first direction and the other beam in a second direction, wherein the first direction and the second direction are orthogonal to each other; joining the two inverted beams into a full-optical beam having the two beams positioned on opposite side of the full-optical beam; and combining the full-optical beam array into the single optical output beam.

In another aspect, a system for increasing energy in a pulse optical beam is provided in the present disclosure. The system includes: a splitter configured to receive an optical input beam having a periodic pulse train with a given repetition frequency and operates to split the optical input beam into N optical signals; a plurality of phase modulators, each phase modulator in the plurality of phase modulators is configured to receive one of the N optical signals from the splitter and operates to phase modulate the received optical signal at a given phase, such that the phase modulated signals output by the plurality of phase modulators are orthogonal to each other; a plurality of amplifiers, each amplifier in the plurality of amplifiers is configured to receive one of the phase modulated signals and operates to amplify the phase modulated signal; and an optical combiner configured to receive each of the phase modulated signals from the plurality of amplifiers and operate to coherently combine each of the phase modulated signals into a single optical output beam.

In an aspect of the present disclosure, the optical combiner may include: a beam splitter configured to split each of the N optical signals into two signals having equal power, such that two beam arrays each having N optical signals with equal power are outputted; and a first inverting mirror and a second inverting mirror, the first inverting mirror configured to invert one beam array in a first direction, and the second inverting mirror configured to invert the other beam array into a second direction orthogonal to the first direction. Further, the optical crystal is a second harmonic generation type of crystal that combines the two beam arrays into the single optical output beam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The method steps, processes, and operations described herein are not to be construed as necessarily requiring their performance in the particular order discussed or illustrated, unless specifically identified as an order of performance. It is also to be understood that additional or alternative steps may be employed.

The present disclosure describes coherently combining periodic pulsed signals. The method of the present disclosures overcomes the limitations of the conventional methods in that it provides a method of achieving high pulsed energies from coherently combined laser arrays with substantially smaller number of parallel laser channels. For example, in the implementation of the present disclosure, combined output pulse energy can be increased proportionally to the square of the number of coherently combined channels (i.e. $E_{pulse} \sim N^2$, where N is the number of channels), in contrast to the conventional method where, in the best case for identical-signal combining the energy is linearly proportional to the number of channels (i.e. $E_{pulse} \sim N$). For example, if to consider pulse energies that using the conventional methods of coherently combining identical signals could be reached only by combining of, for example, 1000 parallel laser channels in an array, with the method described in this disclosure, such energies could be reached with only 32 laser channels, which constitutes more than an order of magnitude simplification in system complexity, thus providing with comparable substantial improvement in system size and cost.

Figure 1:
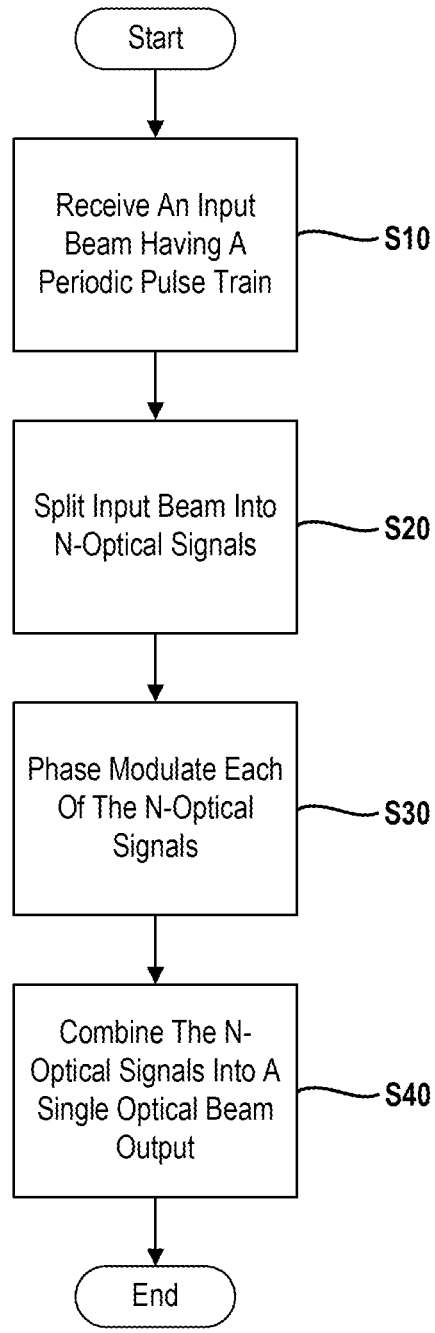
FIG. 1 is a flowchart of a method for increasing energy of a pulse optical beam as described in the present disclosure.

A general overview of the present disclosure is described with reference to a method 100 in FIG. 1. At S10, an input beam (i.e., an input signal) having a periodic pulse train, which can be generated by a pulsed laser, is received. The input beam is then split, at S20, into N-optical signal. Each of the N-optical signals is individually phase-modulated, at S30, such that the N-optical signals become orthogonal to each other and continue to have the same periodic pulse train as the input beam. Subsequently, at S40, the N-optical signals are coherently combined into one beam.

The basic implementation of the present disclosure as a system 200 is described with reference to FIG. 2. An input signal 202 with a periodic pulse train having a repetition frequency $f_{in}$ is generated with, for example, a pulsed laser. The input signal 202 is subsequently split with a 1:N splitter 204 into N-signals 205 for N parallel channels 206.

Each parallel channel 206 can include an amplifier (A) 208, to increase the total average power at the output of the array. Note, however, that even without amplifying the signal 205 in each of the channels 206, the present disclosure can still increase the pulse energy in the combined and down-counted output. Thus, amplifying the signals is optional.

After splitting the input signal 204, the system phase modulates the pulse trains of the signal 205 in each parallel channel 206 with a phase modulator (PM) 210, which is provided in each channel 206. In general, each of the pulse trains are phase modulated with a pattern individually different for each channel 206 and such patterns are orthogonal to each other, so that the set of all N of phase-modulated patterns constitutes a complete and orthogonal signal basis. Signals in each parallel channel 206 remain pulse-periodic with the same repetition frequency $f_{in}$ as the input signal 202 of the system 200.

By properly selecting the phase-modulation pattern for each channel 206 and by properly designing a combining element it is possible to coherently combine all parallel outputs into one combined beam 211 in such a fashion that signal synthesis would occur at the output, such that combined periodic pulsed signal of the combined beam 211 would have a repetition rate $f_{out}$ smaller than the input repetition rate: $f_{out}<f_{in}$. For instance, the system 200 may reduce the repetition rate $f_{out}$ by a factor equal to the number of parallel channels N: $f_{out}=f_{in}/N$. Since the total combined-beam power increases with respect to each individual channel 206 proportionally to N, and the pulse repetition rate decreases by N, the total pulse energy increase in the combined beam 211, when compared to individual pulse energy in each parallel channel 206, may be proportional to $N^2$. With continuing reference to FIG. 2, each parallel channel 206 may also contain a device or a method to control the phase of the signal 205 in each channel 206. In addition, a method or a device for providing a feedback signal from the output of the system 200 may also be provided in each channel 206 to individually recognize, track, and properly correct the phase errors of the signal 205 of each channel 206, so that the phased coherently-combined output beam 211 could be achieved and maintained against detrimental external or internal perturbations.

Figure 2:
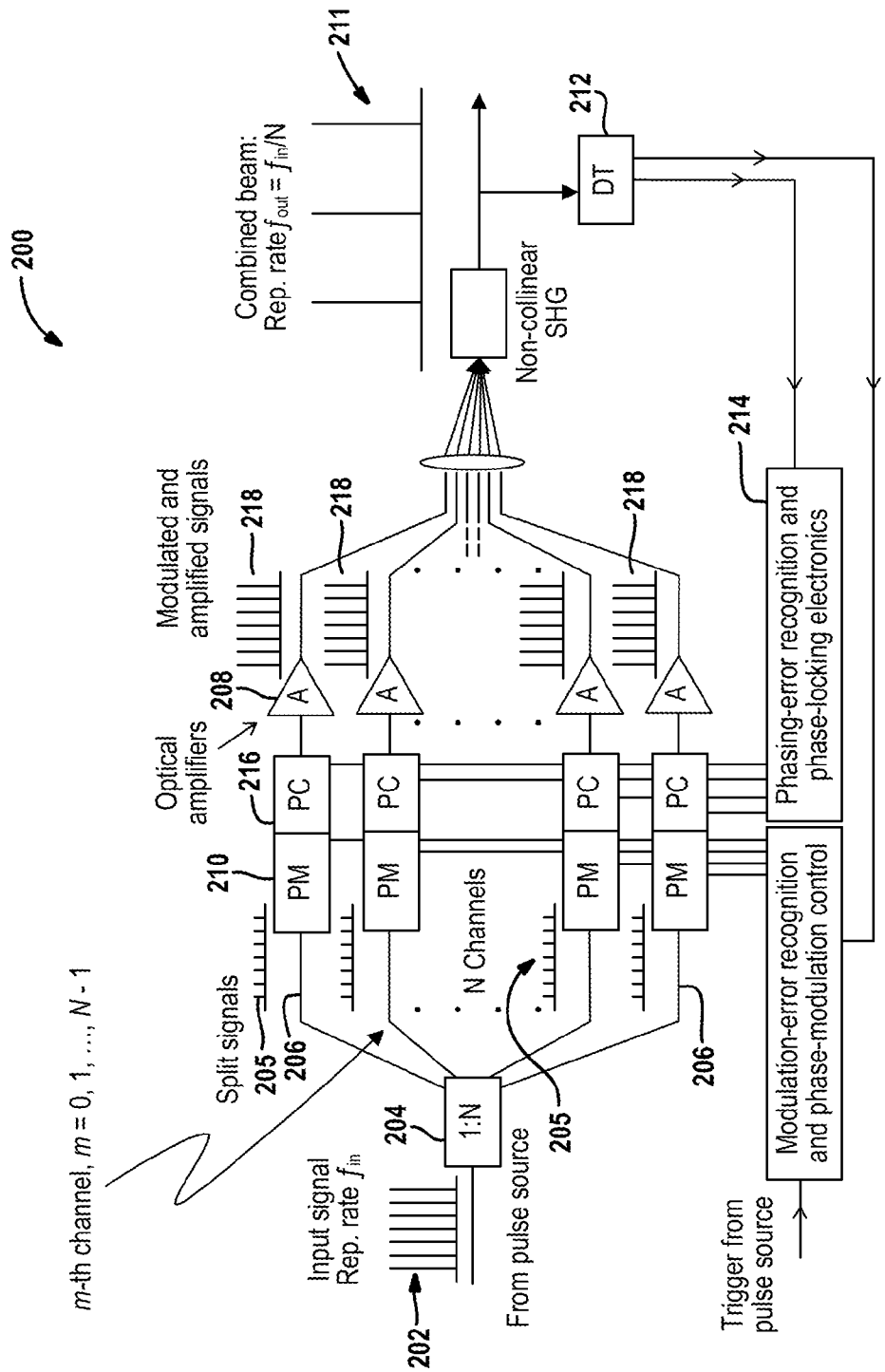
FIG. 2 is a schematic of a system for coherently combining periodic pulsed signals.

In FIG. 2, a general layout of one example of implementing such feedback and phase control is shown. A part of the combined beam 211 at the output is directed to a detector (DT) 212, where it is converted from an optical signal to an electric signal The electric signal from the detector 212 is then received by a phase-locking and control electronics module (Phase Error Recognition and Phase Locking Electronics) 214, where phase errors accumulated in each individual channel are recognized individually and are measured. Accordingly, the correction signal determined by the magnitude of the recognized phase error in each channel 206 is provided to a phase-control device (PC) 216, which is disposed in each channel 206. The phase-control device introduces the correct magnitude of phase into the optical path of the signal 205 in that optical channel 206 such that the detected phase error is compensated. A variety of phase-error recognition and control techniques known in the art, such as LOCSET, could be used. Additional information regarding LOCSET can be found at T. M. Shay, V. Benham, J. T. Baker, B. Ward, A. D., Sanchez, M. A. Culpepper, D. Pilkington, J. Spring, D. J., Nelson, and C. A. Lu, "First experimental demonstration of self-synchronous phase locking of an optical array," Opt. Express 14, 12015-12021 (2006)). One approach, could be to utilize the fact that in the combining method of the present disclosure, each signal 205 is already modulated with a phase-code that is orthogonal to the other signals, and, therefore, could be used as a "tag" for phase-error tracking in each individual channel 206.

There are several advantages of the combining method described in the present disclosure. First, the combining method substantially reduces the required number of parallel laser channels, thus simplifying the system and reducing system cost and increasing its reliability. Second, since each parallel amplifier channel operates at higher repetition rate than the combined output, it significantly reduces pulse energy and peak power in each individual channel, thus allowing operation of each channel below the values limited by each individual channel saturation, nonlinear distortions or optical damage. In effect, since coherently synthesized output pulse train repetition rate is lowered compared to each channel, extracted pulse energy per channel can be much higher than permitted by the fundamental limitations of each individual amplifier in terms of extractable energy, or pulse peak power. Additionally, this also helps to achieve the maximum optical-power extraction efficiencies, since at low repetition rate amplifier efficiency would be limited by the amplified spontaneous emission (ASE) build-up between the pulses, while at high operation frequencies that each amplifier can operate in the invented scheme ASE build-up can be avoided.

In the example of FIG. 2, the present disclosure uses the following method of imprinting orthogonal signals into each channel 202. As shown in the general layout of the system 200, the input signal 202, which has the periodic pulse train having a repetition frequency $f_{in}=1/\Delta T$, where $\Delta T$ is a pulse repetition period, is received. Subsequently, the signal 202 is split into N signals 205 traveling through N parallel channel 206. As discussed, the signals in each channel 206 are phase locked with the phase controller 216 which use proper phase-error recognition and tracking.

One implementation of the phase modulation using modulator 210 of present disclosure could be that the signals 205 in each channel 206 are individually modulated so that the spectrum in each shifts by a fraction of the frequency comb spacing equal to $m/N \cdot f_{in}$ for an m-th channel, where m=0, 1, . . . , N−1. This, for example, could be achieved by applying a suitable linear-phase ramp to each channel 206, or, alternatively, a staircase-shaped phase-modulating signal, which may be approximating the linear phase ramps, as described in more detail below and shown in FIG. 6.

Subsequently, when all modulated signals 218, which may be amplified, are combined into one beam 211 at the output of the array, the resulting combined-beam spectrum contains all the frequency combs. In other words, a frequency comb separation becomes $f_{in}/N$ and the combined beam 211 (i.e., the resulting signal) is periodic but with a down-counted repetition rate $f_{out}=f_{in}/N$. In addition, the frequency comb shift by $m/N \cdot f_{in}$ (for m-th channel) should be with respect to the combined signal 211. In other words, a nonlinear signal-wavelength conversion in the combiner requires a certain modification of the phase-modulation signals imprinted by the phase modulator 210 onto the fundamental-wavelength signal in each channel 206.

In general, the method for a $N^2$ pulse energy can be described in terms of mathematical equations. For example, a periodic pulse train of the input signal 202 received by the system 200 can be written in the time domain as provided in equation (3), where p=−∞, . . . , −1, 0, 1, . . . , −∞ is an integer number denoting a pulse number of each individual pulse $A_0(t)$ in the periodic infinite pulse sequence.

$$A_{in}(t) = \sum_{p=-\infty}^{\infty} A_0(t - p\Delta T) \quad (3)$$

The spectrum of the periodic pulse sequence (i.e. its representation in the frequency domain) can be calculated by taking Fourier transform $\tilde{F}$ of the time domain function and the result can be expressed in terms of angular frequency ω as provided in equation (4), where $$\Delta\omega_r = \frac{2\pi}{\Delta T} = 2\pi f_{in}$$

is the angular repetition rate of the input periodic pulse sequence.

$$\tilde{F}\{A_{in}(t)\} = \Delta\omega_r \tilde{F}\{A_0(t)\} \cdot \sum_{p=-\infty}^{\infty} \delta(\omega - p\Delta\omega_r) \quad (4)$$

Figure 3A:
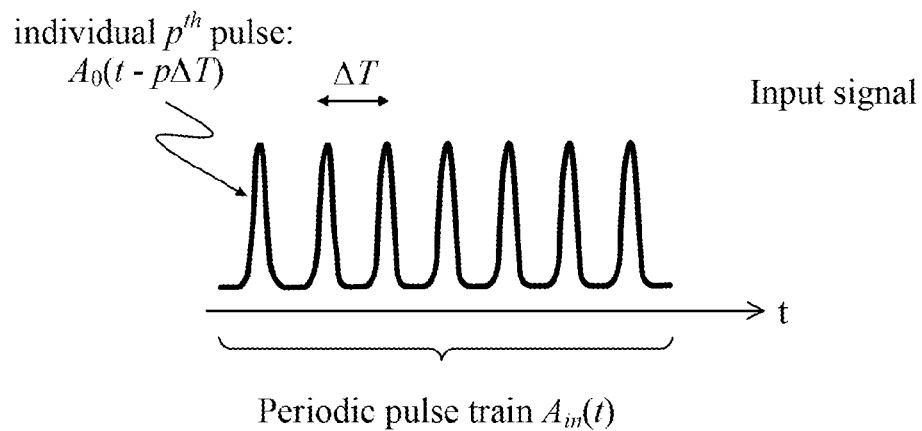
FIGS. 3A and 3B illustrate a waveform of an input signal having a periodic pulse train in time domain and frequency domain, respectively.
Figure 3B:
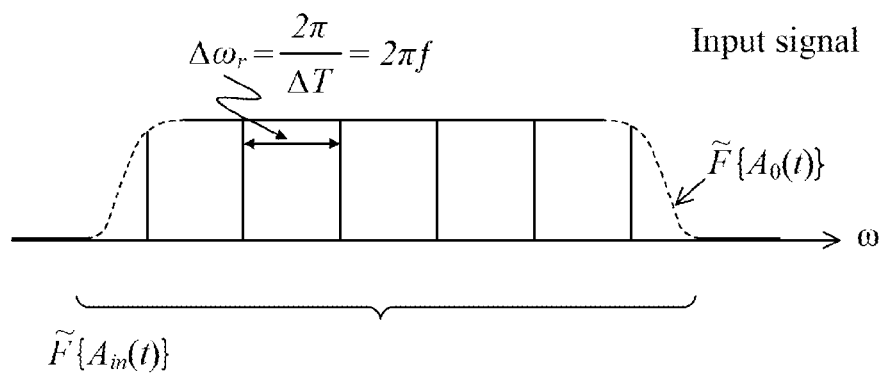

FIGS. 3A and 3B illustrate an example of the input signal 202 in the time domain and frequency domain, respectively. The spectrum illustrated in FIG. 3B has a train of delta functions (i.e., frequency comb) separated by $\Delta\omega_r$, representing individual longitudinal modes that are modulated by an individual-pulse spectrum $\tilde{F}\{A_0(t)\}$. Subsequently the pulse train is split equally into N parallel amplification channels 206.

As mentioned, in the example of FIG. 2, each parallel channel 206 contains the phase modulator (PM) 210, the phase control device (PC) 216, and the amplifier 208. The phase modulator 210 is used to phase modulate the pulse train of the signal 205 in each parallel channel 206 with a pattern individually different for each channel 206 and such, that each modulation pattern is orthogonal to the phase modulation patterns of all other channels 206, so that the set of all N of these patterns constitutes an orthogonal signal basis. A specific choice of the phase modulation pattern, which would produce frequency-comb shifting in each m-th channel by $m/N \cdot f_{in}$, could be the m-th channel signal $A_m(t)$ provided as equation (6).

$$A_m(t) = \sum_{p=-\infty}^{\infty} e^{-ipm\frac{2\pi}{N}} A_0(t - p\Delta T) \quad (6)$$

Figure 6:
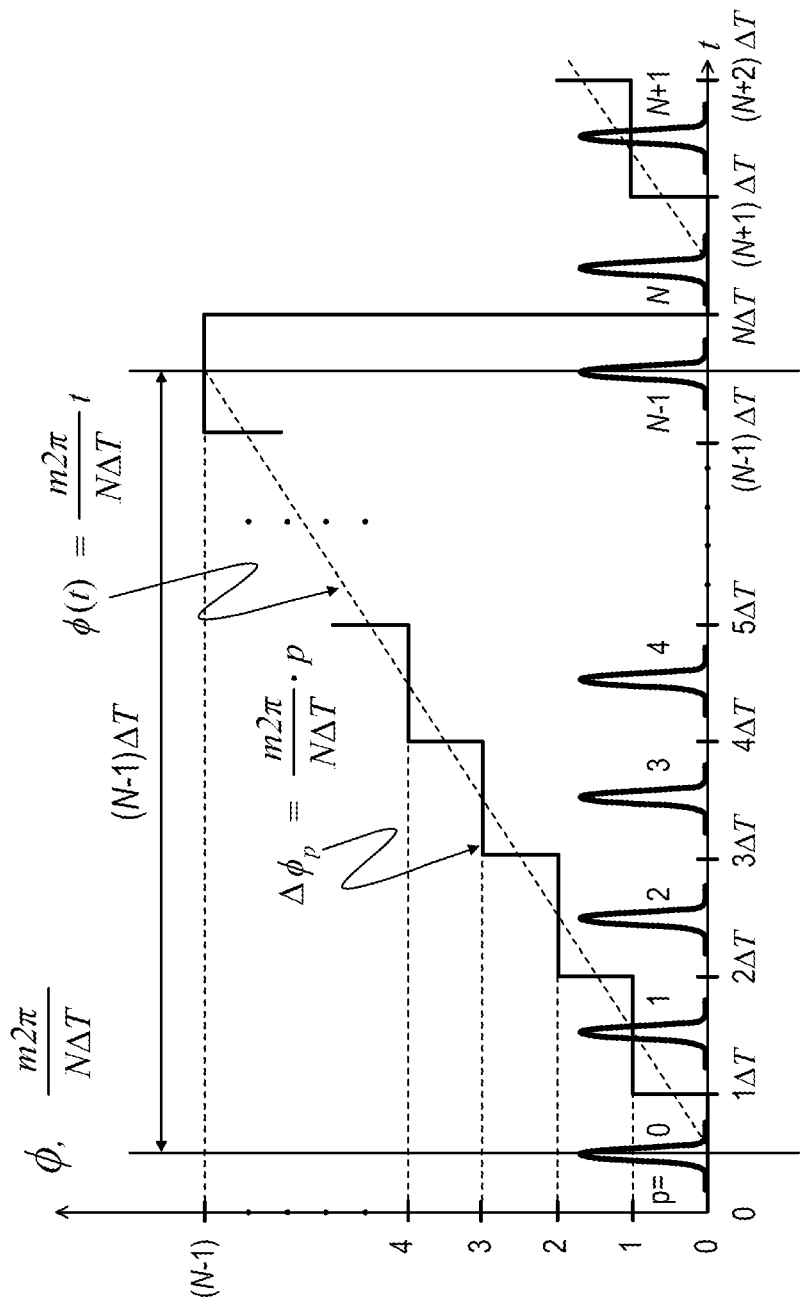
FIG. 6 is a graph of a staircase-shaped phase-modulating signal, having a linear phase ramp.

This phase modulation can be imprinted directly by using a staircase-like periodic phase-modulating signal, such that the phase of p-th pulse in the periodic sequence is $pm2\pi/N$, as shown in FIG. 6. This particular phase code can be described by a Butson-type Hadamard N×N matrix with all its elements being all powers of the complex N-th root of unity, as provided in equation (7) where m is a row and p is a column number of the matrix.

$$(H_{mp})^{1/N} = 1, \text{ for } m,p=0,1,\ldots,N-1 \quad (7)$$

More generally, this particular example of the code used in equation (6) represents a special type of Butson-Hadamard matrix-Fourier matrix, where $H_{mp} = e^{-i2\pi mp}$. Convenience of using the Butson-Hadamard matrix is that all phase-modulated periodic signals in all parallel channels can be described by matrix multiplication of the matrix described in equation (7) with the column-vector consisting of $A_0(t-p\Delta T)$, where column-number p runs through 0, 1, . . . , N−1. It is readily understood that other types of codes fall within the broader aspects of this disclosure.

Accordingly, the phase modulation provided in equation (6) is periodic in the time domain for all channels in parallel, repeating itself every N pulses. In effect this particular modulation pattern given in equation (6) approximates a linear (in time) phase sweep with a slope $(m2\pi/N)\Delta T$, which is marked in FIG. 6 by a dashed line, and which in the frequency domain produces a Doppler frequency shift by $\Delta\omega_r m/N$ (i.e. produces the required frequency-comb shifting in each m-th channel by $m/N \cdot f_{in}$). Therefore, instead of using the staircase-like periodic phase-modulating pattern, one can use a periodic linear-ramp phase sweep $\phi(t)=(2\pi m/N\Delta T)t=(m/N)\Delta\omega_r t$. For practical reasons this phase-ramp is periodic, as shown in FIG. 6. Other types of modulation patterns are also contemplated.

The modulated signals 218 (i.e., the coded signals) in each parallel channel 206 remain pulse-periodic with the same repetition frequency $f_{in}$ as at the input of the system 200. However, the spectrum of the modulated m-th channel signal (i.e., spectrum of the m-th modulated signal 218) in this particular coding is represented in equation (8).

$$\tilde{F}\{A_m(t)\} = \Delta\omega_r \tilde{F}\{A_0(t)\} \cdot \sum_{p=-\infty}^{\infty} \delta\left(\omega + \frac{m}{N}\Delta\omega_r - p\Delta\omega_r\right) \quad (8)$$

Figure 4A:
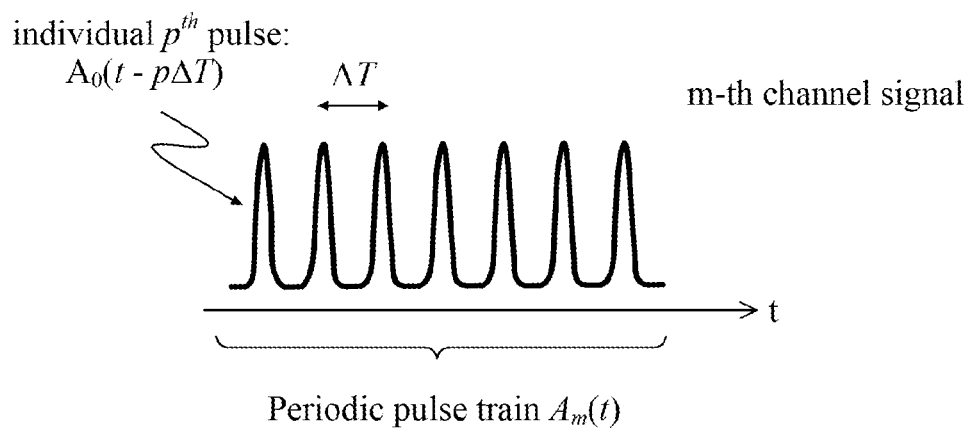
FIGS. 4A and 4B illustrate a waveform of an m-th channel signal that has been modulated in time domain and frequency domain, respectively.
Figure 4B:
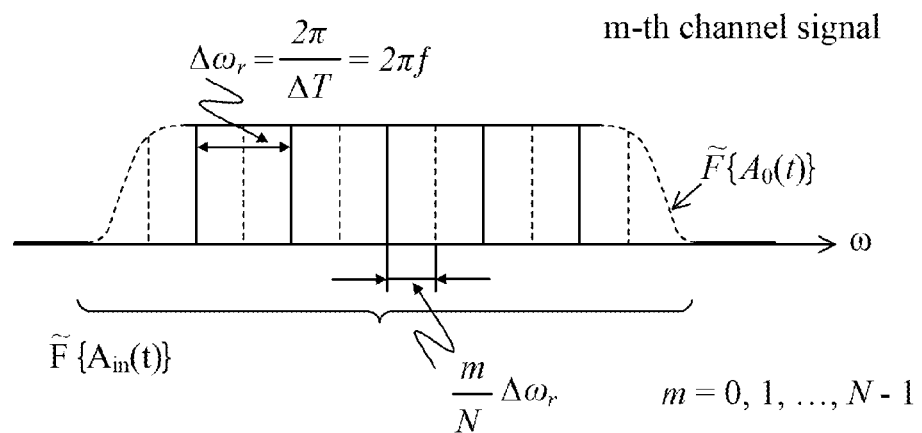

Visualized time and frequency domain pictures of this m-th channel signal are shown in FIGS. 4A and 4B, respectively. It is apparent from this expression that this spectrum also consists of a sequence of delta functions that are modulated by the individual-pulse spectrum envelope, but the frequency of each longitudinal mode in this frequency comb is shifted by $\Delta\omega_r m/N$. Reconstituting all the modulated signals 218 from all the channels 206 into one combined beam 211 at the system output is provided as equation (9):

$$A_{combined}(t) = \sum_{m=0,N-1} A_m(t) \quad (9)$$

In the frequency domain the combined signal is provided in equation (10):

$$\tilde{F}\{A_{combined}(t)\} = \Delta\omega_r \tilde{F}\{A_0(t)\} \cdot \sum_{m=0,N-1} \sum_{p=-\infty}^{\infty} \delta\left(\omega + \frac{m}{N}\Delta\omega_r - p\Delta\omega_r\right) \quad (10)$$

Figure 5A:
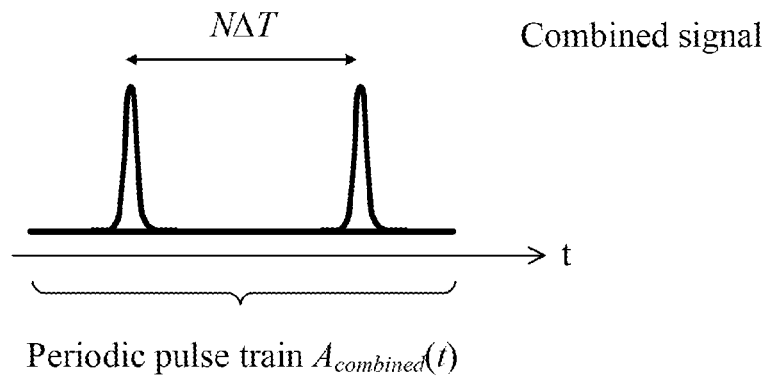
FIGS. 5A and 5B illustrate a waveform of a coherently combined beam in time domain and frequency domain, respectively.
Figure 5B:
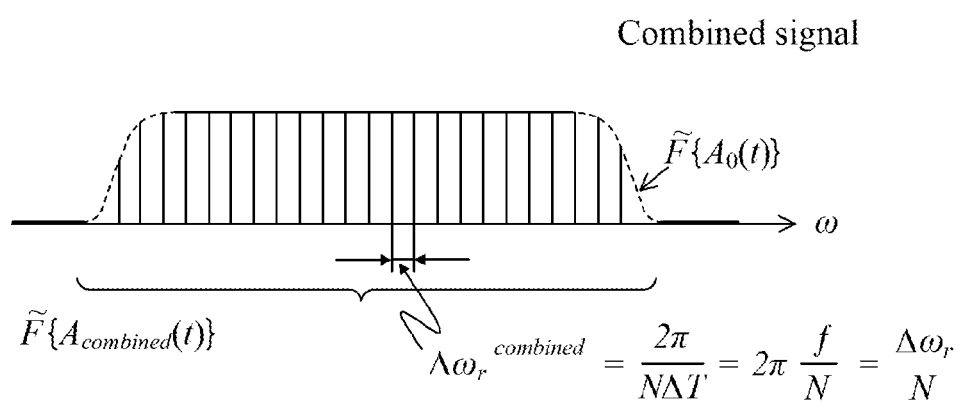

This is simply a frequency comb modulated by $\tilde{F}\{A_0(t)\}$, with adjacent longitudinal modes separated by $\Delta\omega_r/N$. But this is a spectrum of a pulse train with a pulse period $N\Delta T$. Accordingly, the combined beam pulse repetition rate is down-counted N times, as shown in FIGS. 5A and 5B.

Since the total combined-beam power increases with respect to each individual channel 206 output proportionally to N, and the pulse repetition rate decreases by N, the total pulse energy increases, when compared to individual pulse energy in each parallel channel 206, in the combined beam 211 will be proportional to $N^2$.

It is readily understood that the above described orthogonal phase-only coding of each individual-channel periodic-pulse signals using Fourier-type of Butson-Hadamard N×N matrix is only one of many possible orthogonal phase-coding formats. In general, any Hadamard matrix or Butson-Hadamard matrix could be used as a basis for such orthogonal coding, provided that each particular choice of the coding scheme will be such that once all signals from each channel are added at the system output it will produce a synthesized waveform whose repetition rate is down-counted with respect to the signal amplified in each of the channels.

In addition, instead of a periodic pulse signal one can also use a continuous-wave (CW) signal at the system input. After splitting, the CW signal can preferably achieve modulation, which is described by equation (6) for a pulsed signal, by using the linear-ramp phase, as described earlier. The modulated CW signal could then be combined at the output into a single beam.

In using a CW signal, a periodic pulsed signal would be produced at the combined output with the periodicity $\Delta\omega_r$ resulting from the phase-modulation produced frequency shift, and determined by the linear-ramp phase-modulation amplitude $\Delta\phi_A = 2\pi m$ and periodicity $T_{mod}$: $\Delta\omega_r = \Delta\phi_A / T_{mod} = 2\pi m / T_{mod}$. The coherent combining of the CW signal is advantageous to conventional techniques, in that the technique of the present disclosure would not require a pulsed input and any subsequent spectral separation of this pulse into its CW frequency-comb components. Therefore, the approach of the present disclosure would result in a simpler system compared to conventional methods. Note, that beam combining in the case of CW signals can be achieved using standard spectrally-dichroic spectral combining devices, such as diffraction gratings or dichroic filters.

The signal synthesis as described above results in a down-counting of the original pulse repetition rate (i.e. produces combined waveforms described by equations (9) and 10)) only if all the signals $A_m(t)$, as described in equation (6), from each individual channel are (i) completely in phase with each other, and (ii) if they are combined into one spatial beam. In other words, all the m signals are completely overlapped in space after a combining element.

For achieving signal synthesis with the temporal combined-pulse down-counting (i.e., achieving the $N^2$ pulse energy), all phase-modulated beams from parallel amplification channels are to be combined into one beam, such that all the input beams completely overlap in space and propagation direction. The challenge here, however, is that the spectra from all the channels have the same spectral envelope but with differently-shifted frequency-combs underneath it. It is possible to accomplish this spatial combining by exploiting nonlinear wavelength conversion in a non-collinear phase-matching configuration. For example, using a properly configured non-collinear second-harmonic generator (SHG), as well as other nonlinear wavelength conversion processes, such as sum-frequency generation (SFG) or difference-frequency generation (DFG). Nonlinear combining method are also contemplated by this disclosure.

As one example of possible implementations, the disclosure describes combining the beams (i.e., the N-modulated signals) using non-collinear second-harmonic generation in Type I phase-matched uniaxially birefringent BBO crystal. This approach, of course, can be generalized for other uniaxially as well as biaxially birefringent nonlinear materials and for both Type I and Type II phase matching geometries.

Figure 7A:
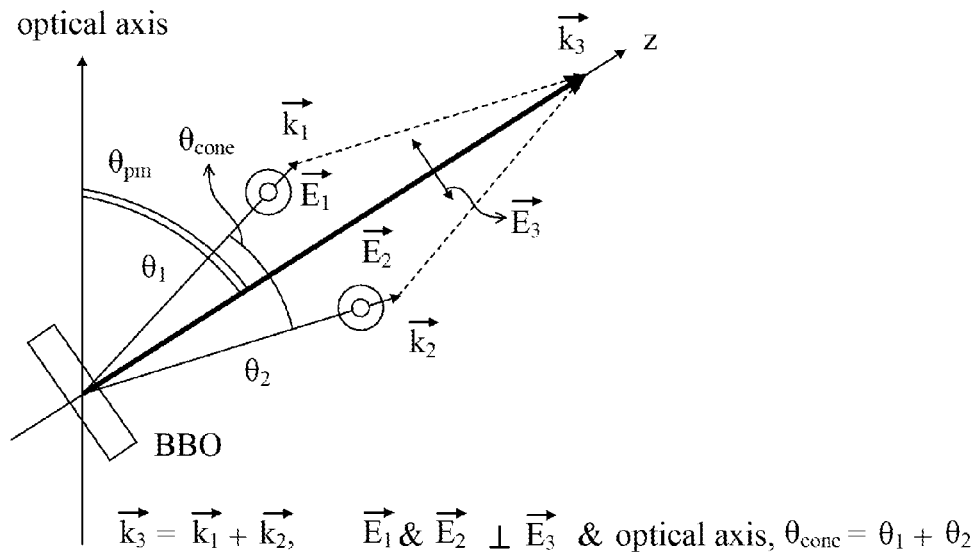
FIG. 7A is an illustration of a Type 1 non-collinear phase matching geometry.
Figure 7B:
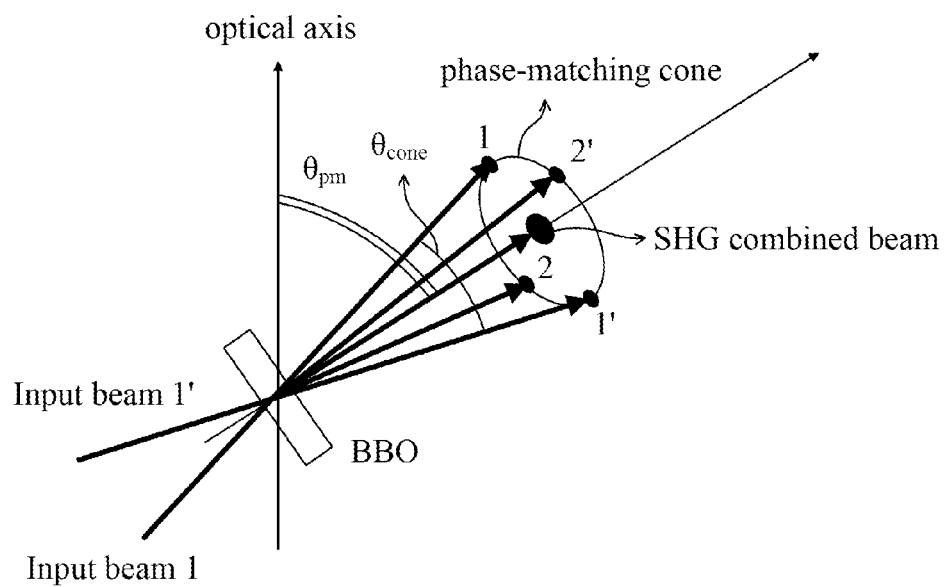
FIG. 7B is an illustration of a Type 1 non-collinear phase matching cone.

The geometry of two non-collinearly incident beams in Type I BBO SHG crystal is shown in FIGS. 7A and 7B, where FIG. 7A provides phase matching geometry and FIG. 7B provides phase-matching cone. For example, two input beams can be of wavelength ~1064 nm from an Yb-doped fiber amplifier. However, any other wavelengths are in principle possible, as long as proper crystal and proper phase-matching angles are chosen.

The two input beams are at a cone angle $\theta_{cone} = \theta_1 + \theta_2$ with respect to each other. Angles $\theta_1$ and $\theta_2$ designate angles between the propagation vectors $\vec{k}_1$ and $\vec{k}_2$ of each corresponding input beam and the direction of the propagation vector $\vec{k}_3$ of the generated second-harmonic signal. Each second-harmonic photon at ~532 nm in this non-collinear geometry is produced by "fusing" two input photons at ~1064 nm, one photon from beam 1 and one from beam 2.

For the Type I phase-matching the input beams are symmetric with respect to $\vec{k}_3$ direction, such that $\theta_1 = \theta_2 = \theta_{cone}/2$. The particular input-beam orientation with respect to the BBO crystal shown in FIGS. 7A and 7B is such that the crystal optical axis is at a phase-matching angle $\theta_{pm}$ with respect to the direction $\vec{k}_3$ of the SH signal and is in the plane that contains $\vec{k}_3$ and is perpendicular to the plane containing $\vec{k}_1$ and $\vec{k}_2$.

Since this particular example is for Type I phase-matching, this means that in this case both input waves are ordinary waves and, therefore, are polarized perpendicularly to crystal optical axis, and the SH wave is extra-ordinary wave polarized in a plane containing optical axis and vector $\vec{k}_3$, as shown in the figure. From this example it is clear that such non-collinear SHG configuration allows to combine two input beams into one output SH beam even for spectrally-overlapped beams.

The reason why this configuration can be used to combine multiple beam pairs is not because the input beams are at a unique orientation which works for this particular phase-matching angle $\theta_{pm}$ and which produces SH output beam direction defined by the same propagation vector $\vec{k}_3$. Actually, any other pair of input beams which are symmetric around direction $\vec{k}_3$ can also be phase-matched and produce the same SH beam direction.

Figure 8A:
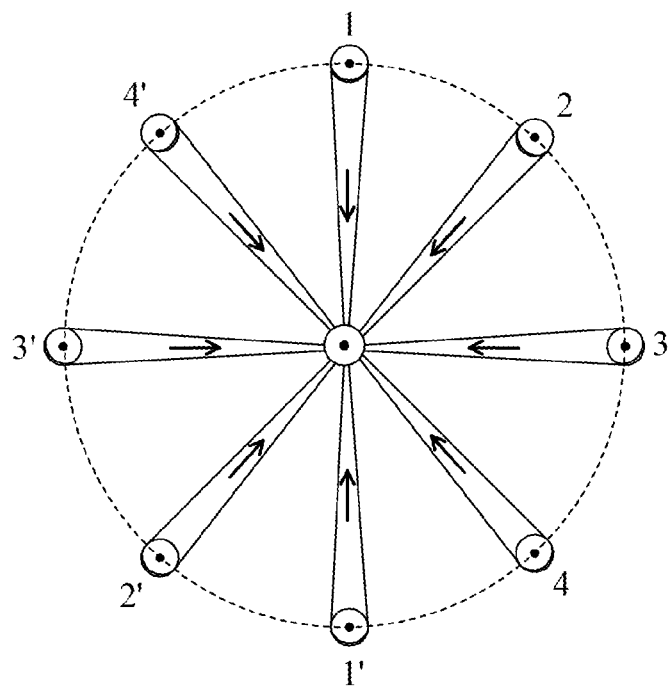
FIG. 8A is a front view of a four beam array configuration.
Figure 8B:
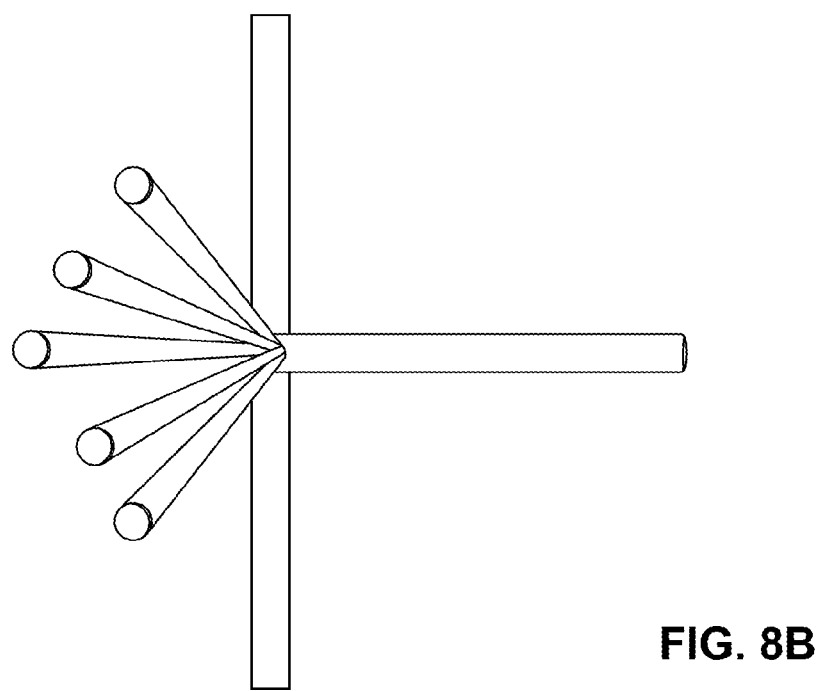
FIG. 8B is a side view of the four beam array configuration of FIG. 8A.

For instance, as illustrated in FIG. 7B, all possible input-beam pair k-vector ends are in a circle, which is in the plane perpendicular to $\vec{k}_3$ forming a phase-matching cone. In particular, an incident beam pair 1'-1 is non-collinearly phase-matched for a given phase-matching angle $\theta_{pm}$, as well as any other beam pair 2'-2 consisting of two beams separated by an angle $\theta_{cone}$ and propagating along a side of a phase-matching cone centered on axis z (z is collinear with to $\vec{k}_3$ and at an angle $\theta_{pm}$ to the optical axis of the crystal). All the input beam pairs should cross at the same point inside the SHG crystal. For this particular example of Type I SHG all input beams are ordinary waves with each polarization perpendicular to the optical axis. An example of 4 input-beam pairs is shown in FIGS. 8A and 8B, with each beam-pair indicated as 1-1', 2-2', 3-3', and 4-4' respectively. For clarity both front view (for an observer facing the crystal and looking along direction $\vec{k}_3$) and side view are shown.

Figure 9:
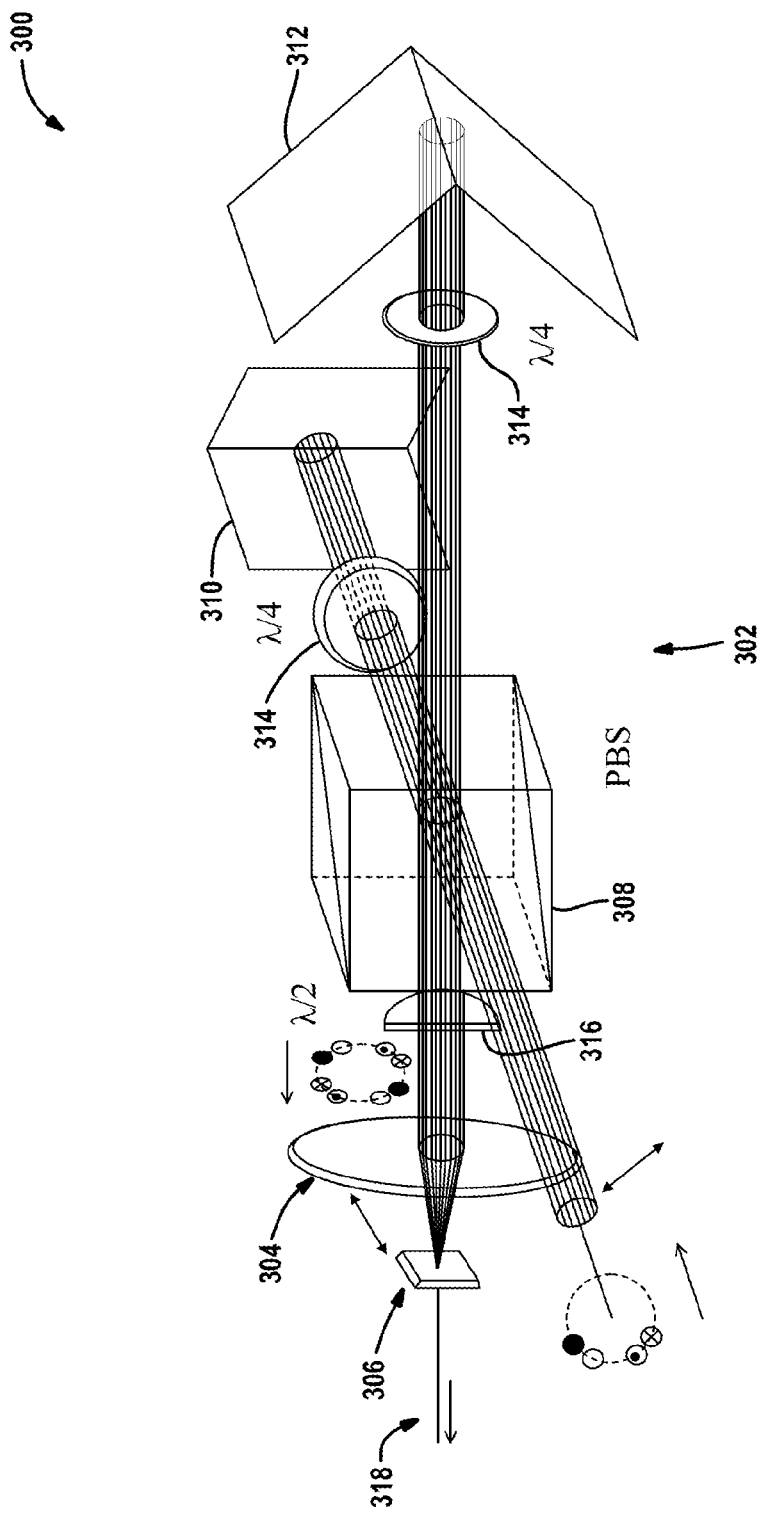
FIG. 9 is a schematic view of a beam array splitting and stacking system using second-harmonic generation.

Since each signal from the array has to be split into an identical-beam pair and all such beam pairs have to be arranged in a pattern exemplified in FIG. 8A, it is useful to consider how such beam splitting and stacking can be achieved in practice. One possible example of a beam array splitting-stacking and combiner, which may be referred to as a second generation apparatus is shown in FIG. 9. System 300 is a compact minimal-alignment system using a beam splitter and orthogonal right angle mirror sets, and may be referred to as an optical combiner.

Figure 10A:
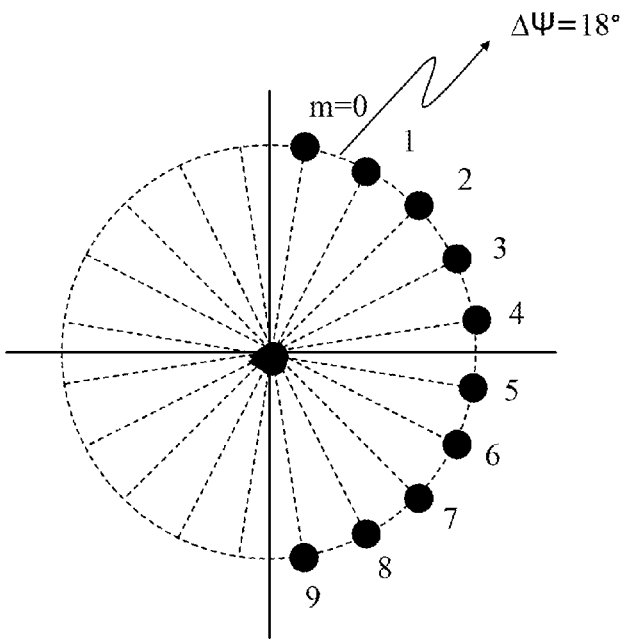
FIG. 10A is a front view of a beam array configuration for the system of FIG. 9.
Figure 10B:
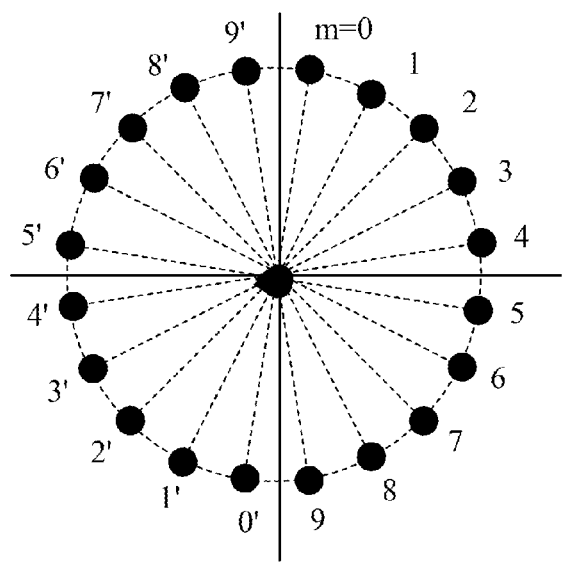
FIG. 10B is a front view of a beam array configuration after the splitting and stacking arrangement performed by the system of FIG. 9.

By way of explanation, an example of N=10 channels are illustrated in FIG. 10A. At the input of the system 300, the beams are arranged in a semicircle with an azimuth angle $\Delta\psi = 360°/2\cdot N = 18°$ between adjacent beams (FIG. 10A). The output of the arrangement is a full circle of $2\cdot N = 20$ beams with the beams of each pair located on opposite sides of the circle (FIG. 10B). Note that in this example the ten beams from ten amplification channels are labeled by a corresponding channel number m=0, 1, . . . , 9, and the split-and-stacked beam pairs are labeled 0-0', 1-1', etc.

System 300 of the SHG combiner provided in FIG. 9 includes (i) a beam splitting and stacking arrangement 302, (ii) focusing lens 304, and (iii) the SHG crystal 306 (Type I phase-matched BBO in this specific example). Individually-shaped circular markers positioned on a circle are used to track the orientation of the beam array, as shown at the combiner input and at the splitting/stacking arrangement output. In the splitting/stacking arrangement 302, the input beam-array with each beam polarized at 45° is incident into a polarizing beam splitter (PBS) 308, where it is split into two equal-amplitude but orthogonally-polarized beam-array replicas.

Each beam array (i.e., arm) then passes a set of two right-angle mirrors sets 310, 312 where one beam array is mirror-inverted in horizontal direction by mirror 310 and another one is mirror-inverted in vertical direction by mirror 312. Two $\lambda/4$ waveplates 314 are provided, one for each arm, to ensure that polarization is flipped to orthogonal orientation after double-pass and, consequently, the two returning beam array will recombine in the PBS 308.

The resulting beam array configuration after the splitting and stacking arrangement but prior to the focusing lens 304 is shown in FIG. 10B. All the beams are split into pairs and each pair is arranged symmetrically in a circle. Note that one half of the beam array passes a half-cut $\lambda/2$ 45-degree waveplate 316 to set all the beams to be linearly polarized in exactly the same orientation, as required by Type I phase matching geometry. After this the beam array is focused by a lens into the SHG crystal 306, which is a Type-I phase-matched BBO crystal, and generates a second-harmonic combined beam 318.

The non-collinear SHG combiner setup represents only one example of a possible configuration. Other arrangements are also possible for achieving the required beam configuration at the input of an SHG crystal. Also, as was stated earlier, a variety of different non-linear crystals can be used as an SHG combiner.

The maximum number of beams that can be combined can be determined by the smallest angular separation $\delta\theta$ between adjacent beam pairs for which SHG cross-coupling between different pairs can still be avoided. This means that this minimum inter-pair angular separation should exceed angular acceptance bandwidth of the crystal. Otherwise the phase-matched "cross-talk" between different beam pairs would produce "parasitic" SH beams, which are non-collinear to the combined beam SH (i.e. would sap the energy from the combined signal).

One way to avoid inter-pair cross-coupling while increasing the number of input beams is to increase $\theta_{cone}$. This can be done since non-collinear phase-matching can be achieved for all angles $\theta_{pm} > \theta_{pm\ collinear}$, i.e. for all angles larger than collinear phase-matching angle. Based on the phase-matching geometry, increasing $\theta_{pm}$ increases $\theta_{cone}$.

Figure 11:
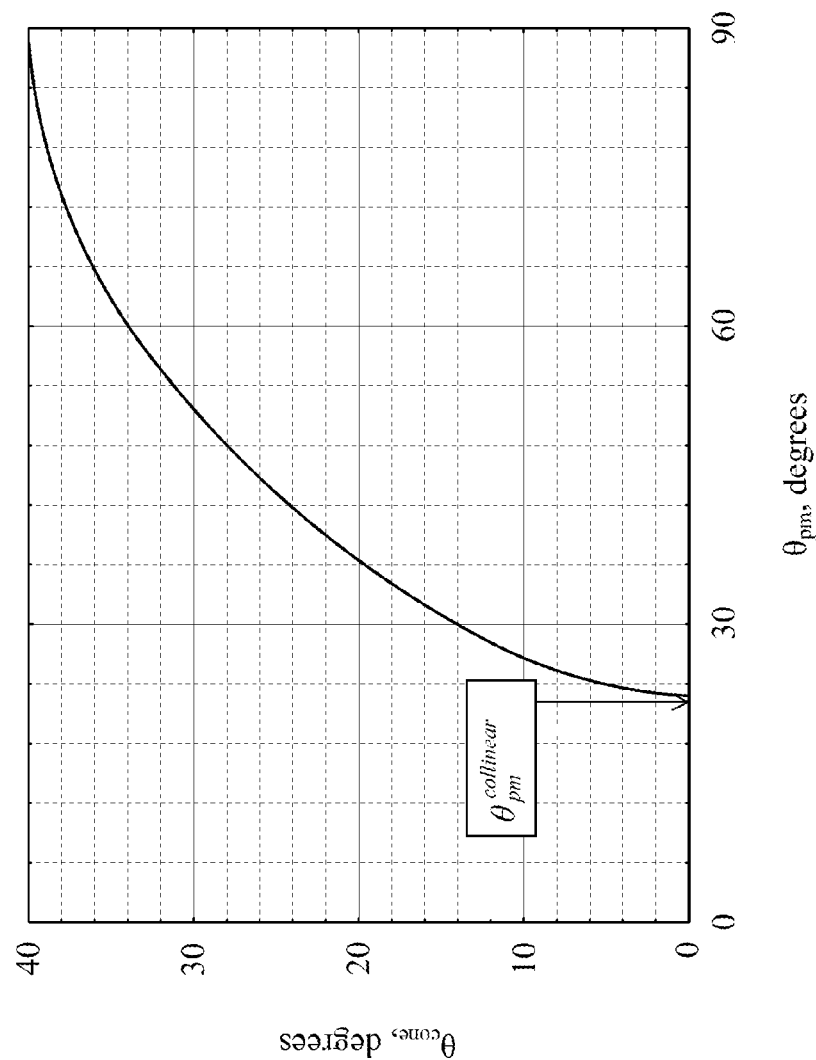
FIG. 11 is a graph depicting a calculated $\theta_{cone}$ dependency on the phase-matching angle $\theta_{pm}$ for a Type I BBO non-collinear case.
Figure 12:
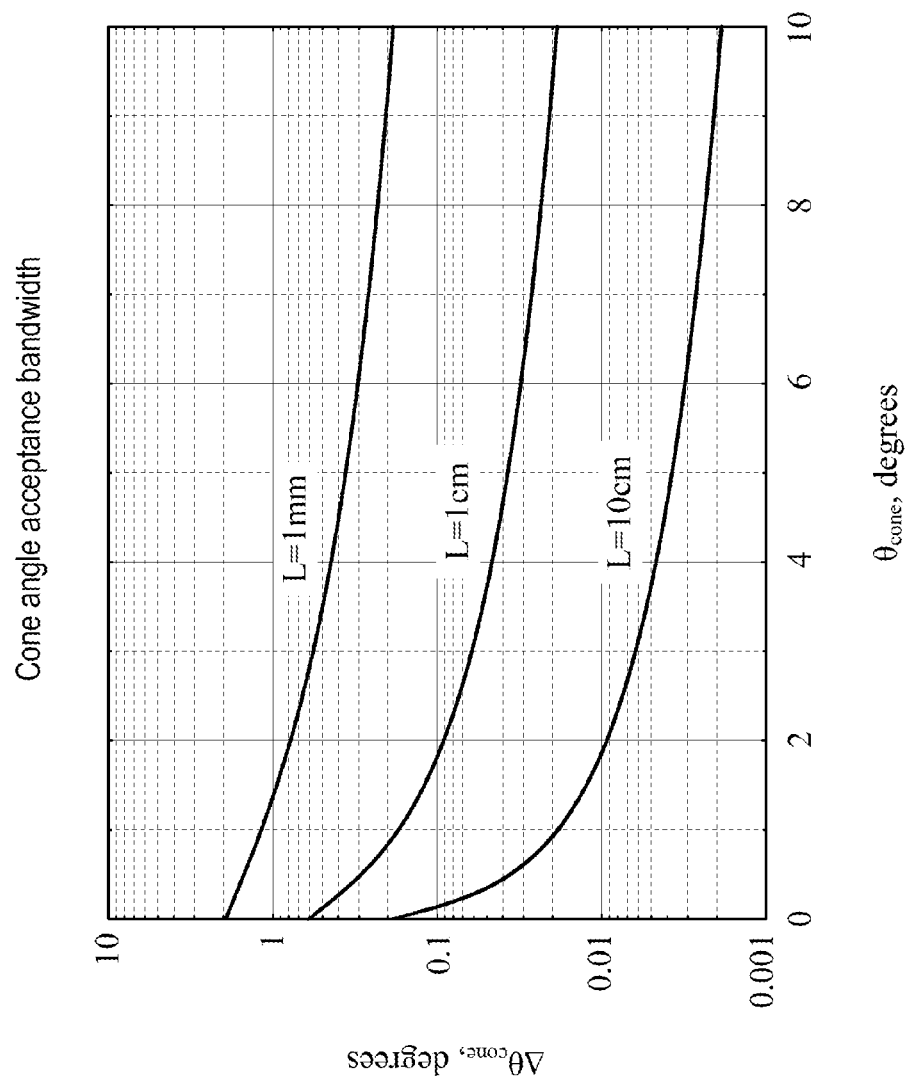
FIG. 12 is a graph depicting a cone angle acceptance bandwidth for three different BBO crystal lengths.

With reference to FIGS. 11 and 12, a calculated $\theta_{cone}$ dependence on the phase-matching angle $\theta_{pm}$ for the specific Type I BBO non-collinear case is shown in FIG. 11, and a calculated angular cone-angle acceptance bandwidth $\Delta\theta_{cone}$ as a function of pump angle $\theta_{cone}$ for three different BBO crystal lengths is shown in FIG. 12. It can be shown that for a beam in each beam-pair the closest angular separation $\delta\theta$ between this beam and the next beam in the adjacent pair is $\delta\theta = \theta_{pump} \cdot (1 - \cos \Delta\psi/2)$. For instance, with reference to FIG. 10B, for beam #1 in the 1-1' pair, it would be either beam #2' or beam #0'.

Figure 13:
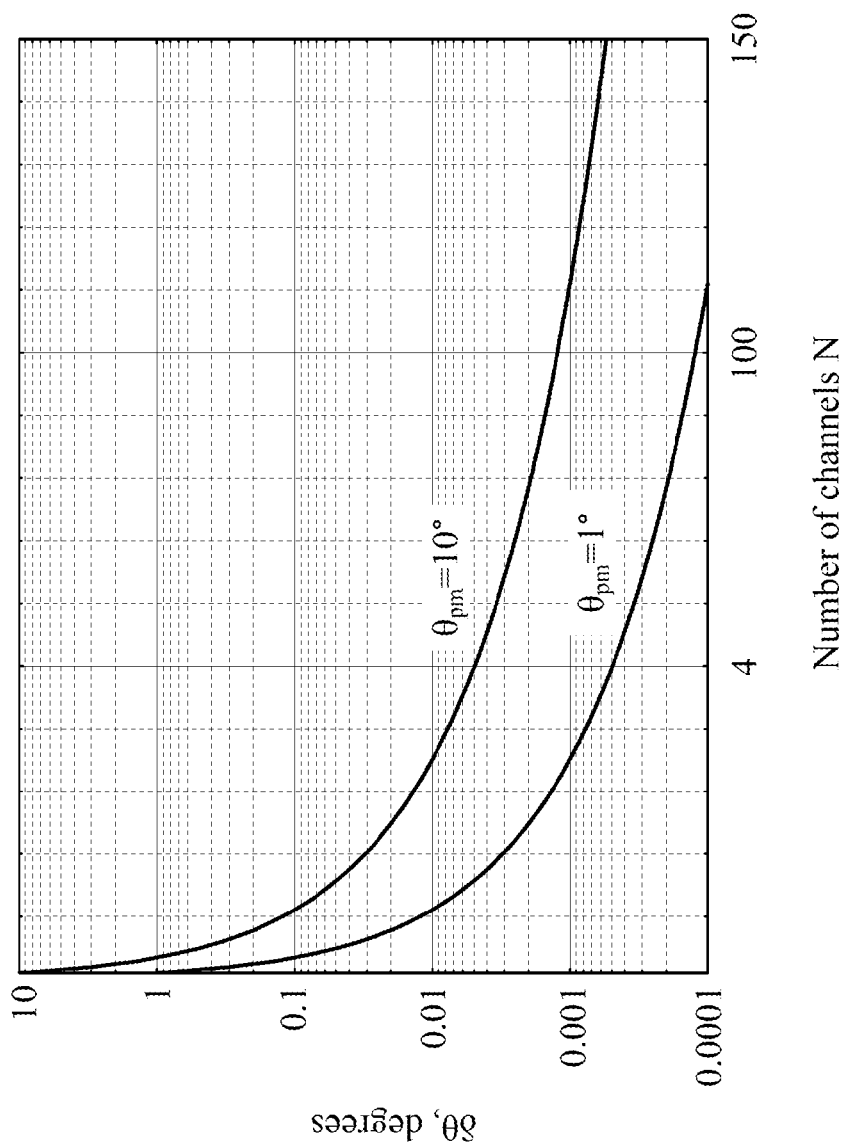
FIG. 13 is a graph depicting an angular separation $\delta\theta$ vs the number of channels in a beam array.

With reference to FIG. 13, the plots for the angular separation $\delta\theta$ vs the number of channels in the array for two pump-angle $\theta_{pump}$ values of 1° and 10° are shown, where $\delta\theta = \theta_{pump} \cdot (1 - \cos \Delta\psi/2)$. Analysis of the data in FIG. 12 and FIG. 13 reflect that large number of channels can be accommodated. For instance, in a specific example case of $\theta_{pm} = 10°$, a 1 mm long BBO accommodates combining of up to 7 channels, 1 cm-up to 25 channels, and 10 cm-up to 80 channels.

Figure 14A:
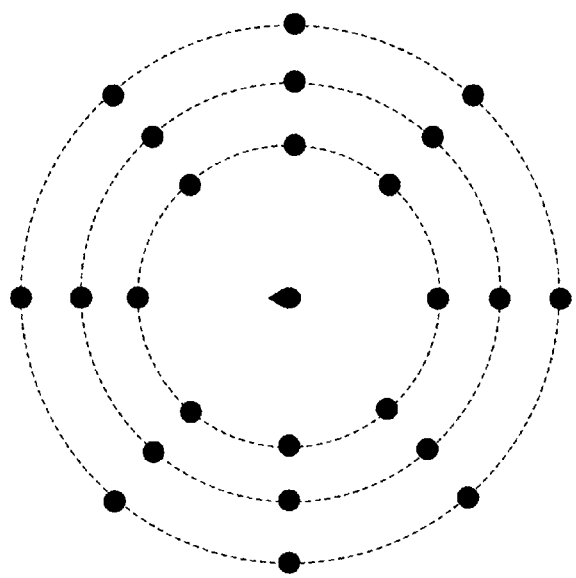
FIG. 14A is a front view of a longitudinal stacking configuration of beam pairs.
Figure 14B:
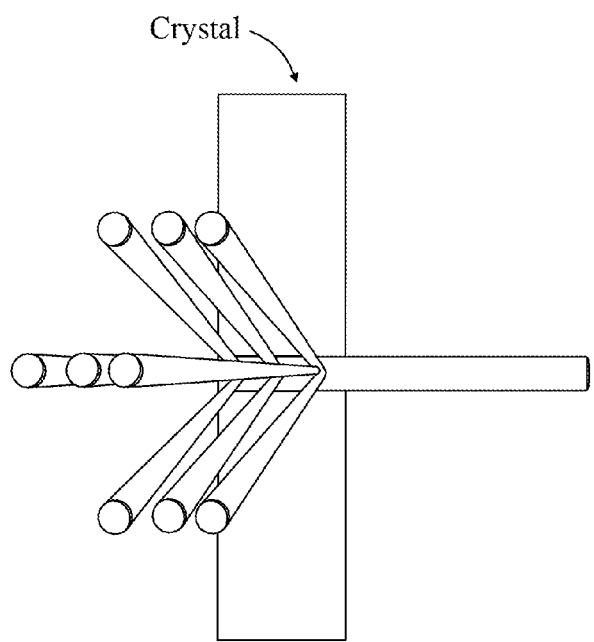
FIG. 14B is a side view of a longitudinal stacking configuration of beam pairs.

Alternatively, in principle an unlimited number of beams could be accommodated if "longitudinal stacking" of the beam pairs is used. For instance, FIG. 14A illustrates how the sets of pairs could be arranged in multiple concentric circles. FIG. 14B illustrates, for simplicity, only two beam pairs for each circular arrangement, which shows how these beams are focused in the crystal. Each pair of beams is incident at the same phase-matching angle $\theta_{pm}$ and has the same $\theta_{cone}$ but is at a different orientation. Beam focusing and beam convergence conditions are all identical for all beam pairs, except for the longitudinal focal point position, which for beam-pairs arranged in larger-diameter circles will be positioned deeper into the crystal. In this case SH from all pairs will just add-up into a single beam. Note that the specific patterns and number of beam sets in FIGS. 14A and 14B are shown only as examples, and other pattern can be used instead.

It should be noted that there are additional constraints on relative angular positions of the beam pairs. Indeed, at certain beam-pair regular angular positions parasitic non-collinear second-harmonic phase-matching can occur even if angular separation $\delta\theta$ is larger than the angular acceptance bandwidth. This can lead to parasitic SHG and consequent cross-talk between some specific beam pairs in the phase-matching cone. This can be calculated, and the correct beam configuration can be determined for each specific beam combining configuration.

Figure 15A:
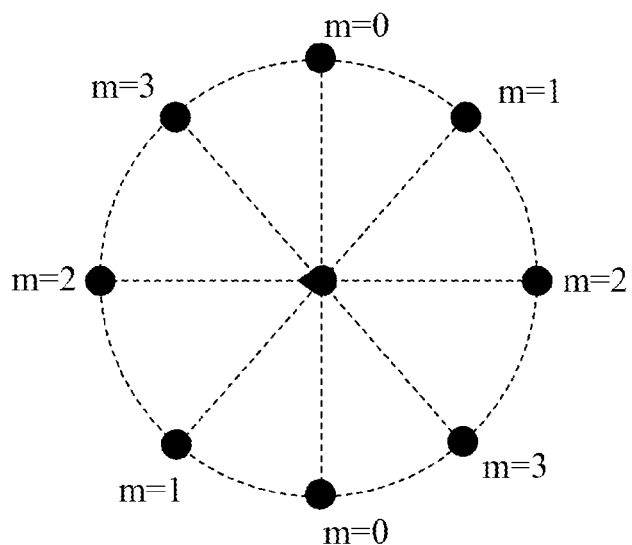
FIG. 15A is a front view of beam array configuration illustrating an example of a first method for assigning channels to the beam.

The present disclosure further describes how individual beams in each beam-pair should be assigned to individual signals from each channel. There are two general assigning methods that can be used. The first method is to assign each m-th channel to one beam-pair, as shown in a specific example for four beam-pairs given in FIG. 15A. It should be understood that any number of beam pairs can be used, not just the four pairs shown here. To implement the first method, output from an m-th channel has to be split into two equal-power beams and each resulting beam is directed into the SHG crystal symmetrically to the SHG output. Note that in this case the exact order in which to assign each channel to a beam pair is not relevant. In other words, the channel-number assignment to each pair can be freely rearranged without any effect on the combining result.

Figure 15B:
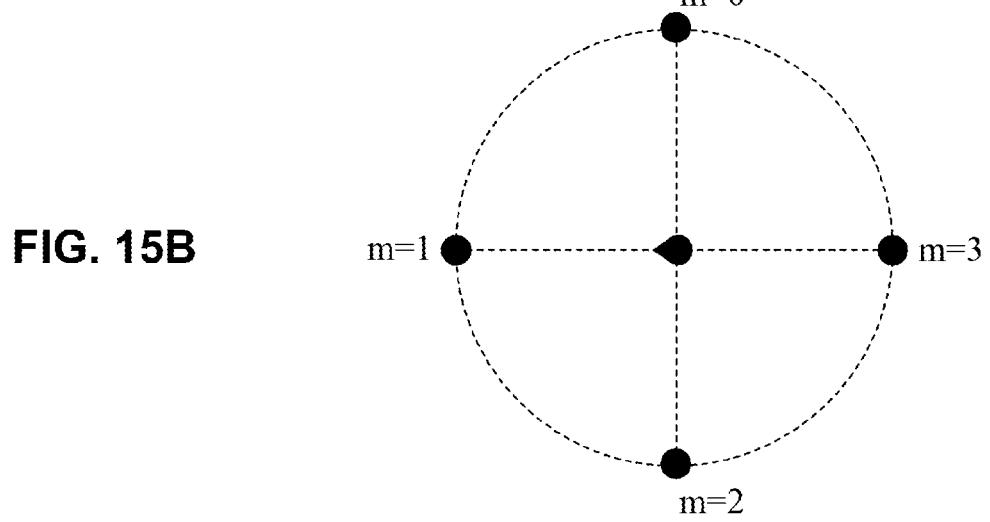
FIG. 15B is a front view of a beam array configuration illustrating an example of a second method for assigning channels to the beam.

The second method assigns each m-th channel to one beam, as shown in FIG. 15B, rather than to a beam-pair of the first method. In this case the exact order of assigning channels to beams becomes of importance. This method, however, does have a disadvantage to the first method, in that the pulse down-counting is reduced by a factor of 2. In particular, for N channels the first method allows to down-count pulse repetition rate by N times, while the second method—only by N/2. More detailed prescription of the channel-to-beam assignment for this method as well as the cause for the reduced down-counting will be discussed in more detail in the text further, which will also clarify the specific example for four-channels assigned according to the second method as shown in FIG. 15B.

In the second-harmonic generation process, SH signal phase $\phi^{SH}$ is equal to the sum of the individual phases $\phi_1$ and $\phi_2$ of each input signal in the beam-pair $\phi^{SH}=\phi_1+\phi_2$ (plus additional $\pi/2$ phase added due to SHG process itself). This means that there is no need to control the relative phases between these two beams after the splitting. It is only necessary to ensure that optical pulses in each split arm propagate the same distance in order to arrive at the SHG crystal at the same time as its replica. This phase, however, will be added to the phase acquired by propagating the signal through the channel. Since for coherent combining all relative phases between all the channels have to be made equal by a proper phase-control (i.e. phase differences between the channels have to be set to zero), as described in more detail further, this phase compensation is able to offset the complete amount of the phase acquired in the SHG process as well. This applies equally well to both the first and the second methods of assigning channels to beams.

This additional SHG-acquired phase, however, requires modifying the phase-modulation format for fundamental-wavelength signals in each channel, compared to the general orthogonal-coding description given earlier. Since the first channel-to-beam assignment method is associated with combining two identical replicas of each channel signal it requires the modulated phase of the p-th pulse in the periodic sequence of the m-th channel (at fundamental wavelength) to be $(pm2\pi/N)/2$. Then each beam-pair produced combined signal at second-harmonic wavelength will consist of a periodic pulse train with the corresponding pulse-to-pulse phases equal to $pm2\pi/N$, as prescribed by equation (6). In terms of frequency-domain picture the frequency-comb spectrum of the modulated m-th channel signal at fundamental wavelength after applying this modified modulation pattern is provided by equation (11), where after SHG conversion the frequency comb spectrum is reflected by equation (12), which is similar if not identical to equation (8).

$$\sum_{p=-\infty}^{\infty} \delta\left(\omega + \frac{m}{2N}\Delta\omega_r - p\Delta\omega_r\right) \tag{11}$$

$$\sum_{p=-\infty}^{\infty} \delta\left(\omega + \frac{m}{N}\Delta\omega_r - p\Delta\omega_r\right) \tag{12}$$

Consequently, the combined-beam signal consisting of the sum of SHG-converted outputs of all the channels is still described by equation (10), but with frequency $\omega$ replaced by $2\omega$. In addition, the combined-beam signal should be a pulse train with N-times down-counted repetition rate. Similar coding changes would need to be used in the cases when sum-frequency generation (SFG) or difference-frequency generation (DFG) would be used in a non-collinear combiner instead of SHG. Specific coding changes in each case can be determined by using the same approach as exemplified in the paragraph above. Since the second channel-to-beam assignment method combines different channels in each beam pair, there is a large number of possible combinations. It can be shown that each combination is associated with a different degree of down-counting. The best down-counting rate that can be reached, however, is still factor of 2 lower than the maximum achievable one by using the first channel-to-beam assignment method. The prescription for this "best case scenario" requires the pulse-to-pulse phase in the first channel assigned to one beam in the pair to be modulated as $pm_1 2\pi/N$, and in the second channel assigned to another beam in the pair as $p(N/2+m_1) 2\pi/N$, where $m_1=0$, 1, . . . , N/2-1. Frequency comb of the sum of SHG-converted outputs of all the channels is described by equation (13), which corresponds to a pulse train with N/2 times down-counted repetition rate.

$$\sum_{m=0,N-1} \sum_{p=-\infty}^{\infty} \delta\left(2\omega + \frac{2m_1}{N}\Delta\omega_r + \frac{\Delta\omega_r}{2} - p\Delta\omega_r\right) \tag{13}$$

Similarly, any channel-to-beam assignment combination can be analyzed and it can be shown that all other combinations yield lower down-counting rates, which even include cases with no down-counting. Consequently, the second method of assigning channels to beams is less preferable than the first method.

This non-collinear SHG geometry allows combining multiple separate beams into a single second-harmonic beam, but it should be established under what conditions pulse repetition down-counting can occur. For this, coupled-mode equation description of the second-harmonic conversion process from non-collinear input beam pairs into a single wavelength-converted output beam should be considered. Such equations can be derived using any standard procedure. For the non-collinear beam-pair combining geometry described earlier, the result of a derivation procedure is provided in the following set of 3N coupled-mode equations (CME) of equation (14):

$$\frac{dA_m^I(z)}{dz} = -i\kappa A_m^{SH}(z)A_m^{I*}(z)e^{i\Delta k_m z} \tag{14}$$

$$\frac{dA_m^{II}(z)}{dz} = -i\kappa A_m^{SH}(z)A_m^{II*}(z)e^{i\Delta k_m z}$$

$$\frac{dA_m^{SH}(z)}{dz} = -i\kappa A_m^I(z) \cdot A_m^{II}(z)e^{-i\Delta k_m z}$$

Each set of the above three CME describes SHG by the m-th channel input beam pair, and channel index m runs through all N channels, i.e. m=0, 1, . . . , N-1. Direction of axis z coincides with the second-harmonic wave-vector $\vec{k}_3$ direction, as shown in FIGS. 7A, 7B.

Equation (15) provides a wave-vector mismatch, where $k_m^{SH} \equiv |\vec{k}_3|$.

$$\Delta k_m = k_m^{SH} - k_{mz}^I - k_{mz}^{II} \tag{15}$$

Equation (16) provides a coupling coefficient, where $n_{2\omega}$ and $n_\omega$ are refractive indices at each corresponding frequency.

$$\kappa = d_{123}\sqrt{\frac{\mu_0}{\varepsilon_0 \frac{2\omega^3}{n_{2\omega}n_\omega^2}}} \quad (16)$$

Field amplitudes of each of the input beams in the m-th pair are A'(z) and A"(z) (single ' and double " indicating each of the two beams in all the notation used in these CME), and field amplitude of the generated by this beam-pair SH beam is $A_m^{SH}(z)$. These field amplitudes are defined in equation (17) with i identifying each field. $E_i$ is the electric field magnitude.

$$A^i = \sqrt{\frac{n_i}{\omega_i}} E_i \quad (17)$$

For this choice of amplitudes $|A^i|^2$ is proportional to the photon flux at $\omega_i$, the proportionality constant being independent of frequency.

The CME set of equation (14) describes SHG conversion by each beam-pair independently from other beam pairs. Consequently, the total resulting SH beam is a direct sum of all different SH fields generated by each individual beam pair. Interference between all these individual SH fields produces "beating" between them in time domain, which is what leads to a down-counted pulse train described by equation (10). Fundamentally, this is a result of the fact that all frequency-combs of individually-modulated channels are not overlapping, i.e. all channel-signals are orthogonal to each other, and all second-harmonic fields are distinguishable from each other since they contain distinctly different and non-overlapping frequency combs each.

If these beam-pair fields are not orthogonal to each other, then the CME derivation leads to a set of equations different from the one in equation (14). This happens if, for example, signals from the channels are not individually modulated and are represented by identical and overlapping frequency combs. This set of CME derivation is described below in equation (18).

$$\frac{dA_m^I(z)}{dz} = -i\kappa A^{SH}(z) A_m^{II*}(z) e^{i\Delta k_m z} \quad (18)$$

$$\frac{dA_m^{II}(z)}{dz} = -i\kappa A^{SH}(z) A_m^{I*}(z) e^{i\Delta k_m z}$$

$$\frac{dA^{SH}(z)}{dz} = -i\kappa \left[ \sum_{m=0,\ldots,N-1} A_m^I(z) \cdot A_m^{II}(z) e^{-i\Delta k_m z} \right]$$

Note that this is now a set of 2N+1 equations describing all channels with m=0, 1, . . . , N−1. Phase mismatch is now described by equation (19).

$$\Delta k_m = k^{SH} - k_{mz}^I - k_{mz}^{II} \quad (19)$$

The substantial difference of equations (18) from those in (14) is that they describe SHG generation of all beam-pairs into the same SH field, i.e. all non-collinear interactions are now linked since all SH fields produced by each beam pair are identical with identical frequencies in their spectra. Consequently, in this case no pulse down-counting can occur.

In principle, instead of SHG processes, sum-frequency generation (SFG) or difference-frequency generation (DFG) processes can be used for such non-collinear beam combining. The main distinction from SHG, however, would be that both SFG and DFG would require different optical wavelengths in each beam in the beam-pair, and each different-wavelength signal should be suitably prepared to have the required and matching frequency comb structure. The usefulness of SFG and DFG based approaches would be that it would allow to access different wavelengths. For example, DFG based combiner would produce combined signal at the longer wavelength than the incident signals. Difference in the two channel wavelength in each beam pair could be achieved either by using different regions of the gain spectrum of the gain medium or, alternatively, using different gain media. For example, in the case of fiber gain medium Yb-doped and Er-doped fiber amplifiers could be used to amplify properly phase-modulated signals for each signal in the combining-beam pair.

Based on the foregoing, the $N^2$ combing approach can be used for any periodically-pulsed laser system, either long pulse, short pulse (picoseconds—nanosecond pulse duration range), or ultrashort pulses (femtosecond or shorter pulse duration range). Consequently, the $N^2$ combining amplification system can be either direct pulse amplification system for long or short and ultrashort pulses, or chirped pulse amplification system (CPA) for ultrashort pulses, which would be stretched prior to amplification, amplified in parallel channels, and then recompressed in a compressor, which can be positioned before or after the non-collinear nonlinear beam combiner.

Figure 16:
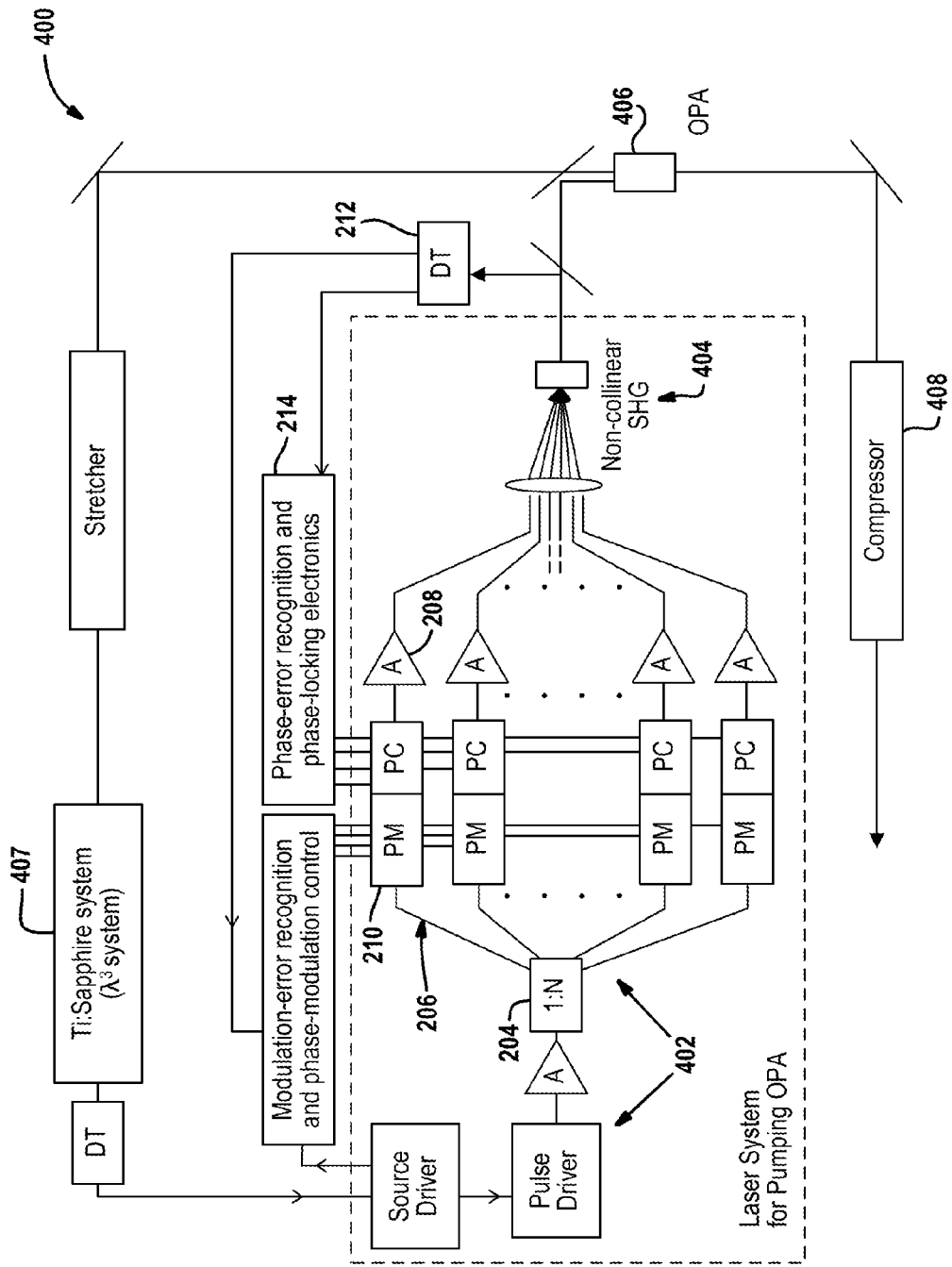
FIG. 16 is a schematic of a hybrid system for generating high energy nanosecond pulses.

FIG. 16 illustrates a hybrid approach in which the $N^2$ combining parallel-amplifier array is used to generate high energy nanosecond pulses, which after nonlinear combining and concurrent down-counting could then be used to pump an optical parametric chirped pulse amplification (OPCPA) system. Briefly, the system 400 includes an Yb-fiber array 402 arranged for $N^2$ combining and producing nanosecond-pulsed signal in ~1060 μm wavelength range, a non-collinear SHG beam combiner 404 producing combined high energy signal in ~530 nm wavelength range, and an OPA crystal 406 in which stretched pulses from a Ti:Sapphire system 407 are amplified at ~800 nm. These OPA amplified signals are subsequently recompressed in a pulse compressor 408.

$N^2$ beam combining can also be implemented using linear means. For achieving $N^2$ beam combining using linear combining elements the following two conditions should be met: (1) each combining element should be provided with a time delay $T_{delay}$ comparable to a repetition period NΔT of a combined signal $T_{delay} \sim N\Delta T$, and (2) the combining elements should spatially multiplex beams each containing a periodic signal characterized by a different and spectrally non-overlapping frequency comb, as provided by equation (20). However, all of them with spectrally overlapping individual-pulse spectral envelopes $F\{A_0(t)\}$.

$$\sum_{p=-\infty}^{\infty} \delta(\omega - p\Delta\omega_r) \quad (20)$$

Figure 22A:
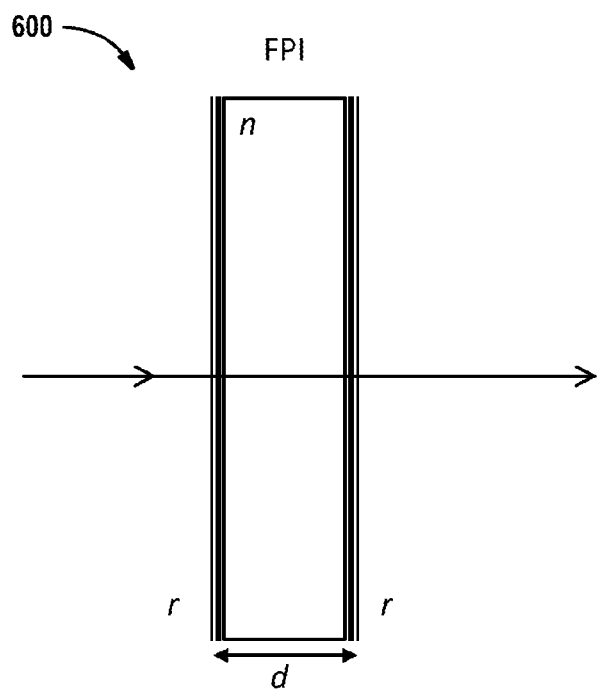
FIG. 22A is a schematic of a Fabry-Perot (FP) interferometer a resonant cavity.
Figure 22B:
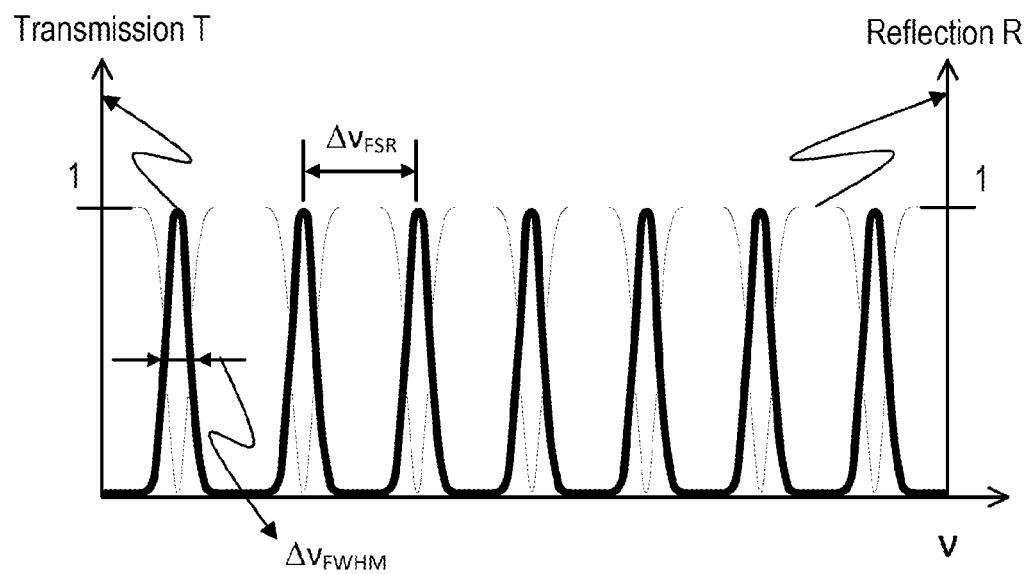
FIG. 22B is a transmission T spectral characteristics of the FP interferometer of FIG. 22A.

Both conditions can be simultaneously fulfilled with various types of resonant cavities. One example of such a resonant cavity is a Fabry-Perot interferometer (FPI) 600, depicted in FIG. 22A, and consisting of two parallel mirrors each characterized by reflectance r, and separated from each other by a distance d. In general, there can be a material characterized by its refractive index n placed between these mirrors. Transmission T spectral characteristics of this FP interferometer is shown in FIG. 22B. Transmission spectrum (indicated by a thick solid line) consists of spectrally-periodic transmission peaks, each characterized by identical spectral width $\Delta v_{FWHM}$ and spectral separation between them $\Delta v_{FSR}$ (usually referred to as a Free Spectral Range). For reference, FPI reflectance R=1−T characteristics is also shown by a thin dashed line on the same figure. Characteristics of FPI is well known. Its free spectral range $\Delta v_{FSR}$ and the ratio $\Im$ between separation of FP transmission peaks to their Full-Width-Half-Maximum (FWHM) can be found using equation (21), (22), and (23) where c is the velocity of light.

$$\Delta v_{FSR} = \frac{c/n}{2 \cdot d} \quad (21)$$

$$\frac{\Delta v_{FSR}}{\Delta v_{FWHM}} = \Im = \frac{\pi \sqrt{F}}{2} \quad (22)$$

$$F = \frac{4r^2}{(1-r^2)^2} \quad (23)$$

Figure 23:
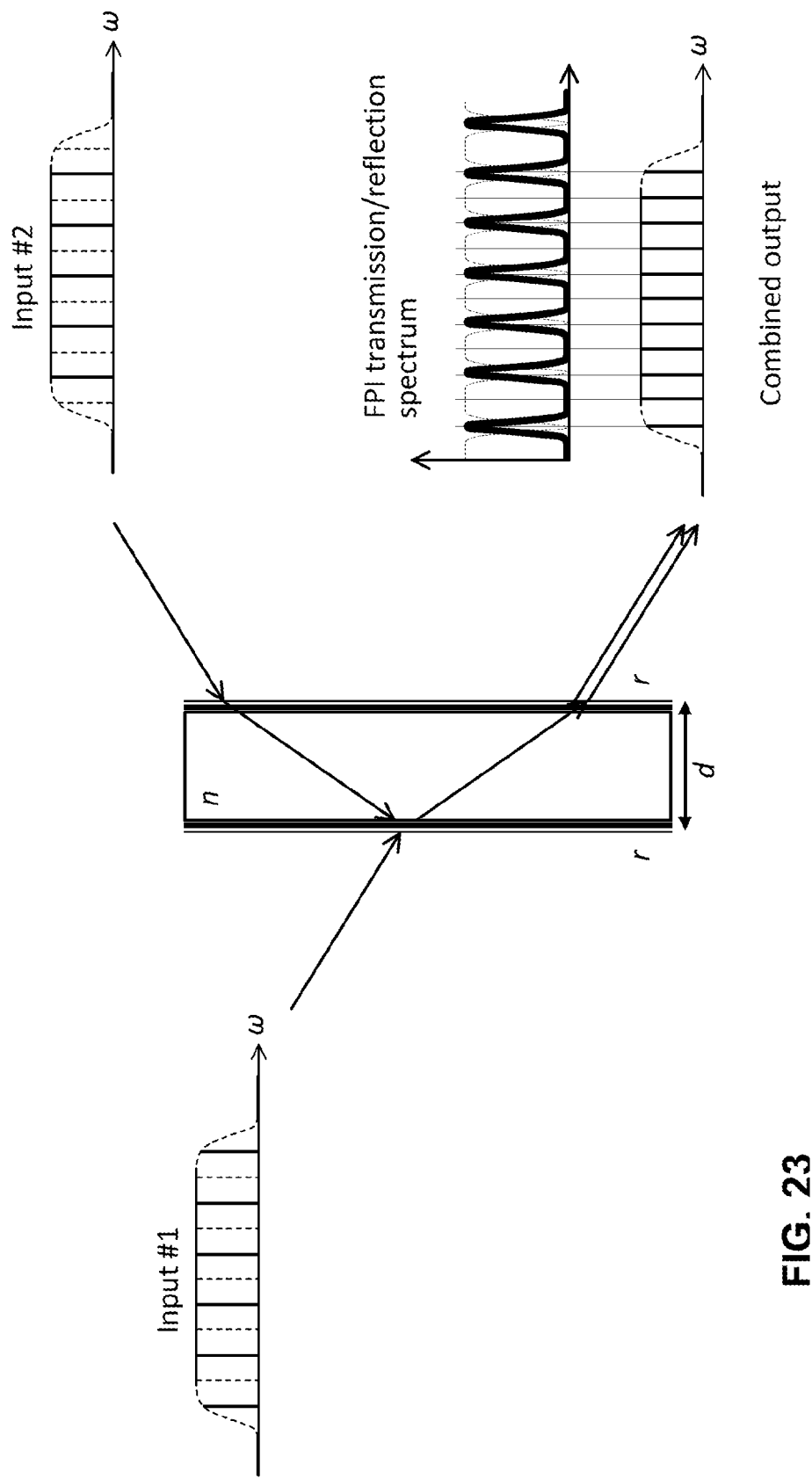
FIG. 23 is a schematic depicting spatially multiplex beams entering a FP interferometer.

The second condition can be achieved with two beams (i.e., Input #1 and Input #2) configured according to FIG. 23. Both beams should be incident into an FPI from opposite sides and at the same incidence angle. FPI ratio $\Im$ should be $\Im$>2. The two beams contain signals with two different and interlaced frequency combs, such that the beam configured for transmission have its frequency comb coinciding with the transmission-peaks of the FPI, and the beam configured for reflection have its frequency comb coinciding with the reflection maxima between the transmission. Accordingly, this means that $\Delta v_{FSR}$ of the FPI combiner should be equal to the repetition rate $\Delta v_r$ of the two incident signals: $\Delta v_{FSR} = \Delta v_r$. Then the output beam would combine both incident beams, which would be spatially and directionally overlapped as well as with their frequency combs spectrally interlaced ("Combined output" in FIG. 23).

Figure 24A:
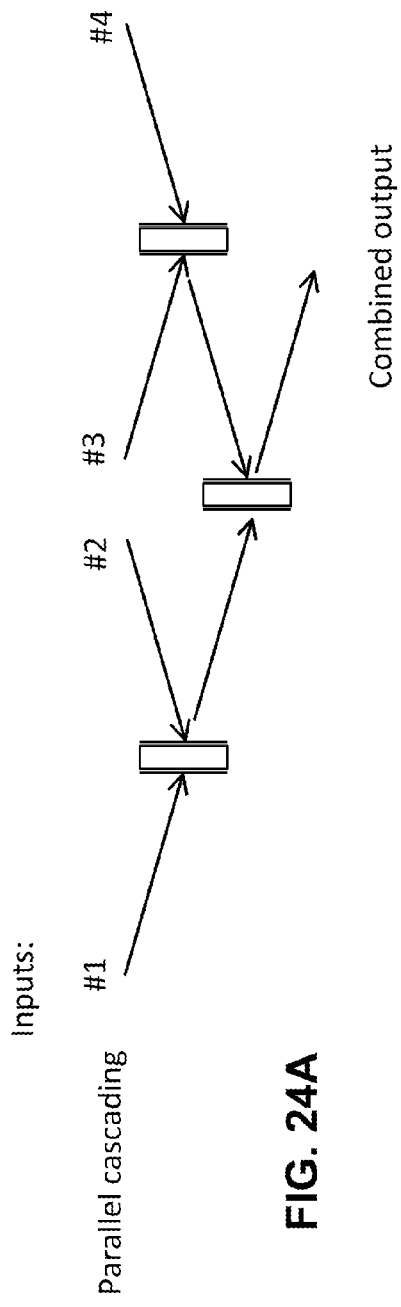
FIGS. 24A and 24B are schematics of a "binary tree" type of arrangement of cascading FP interferometer based combiners.
Figure 24B:
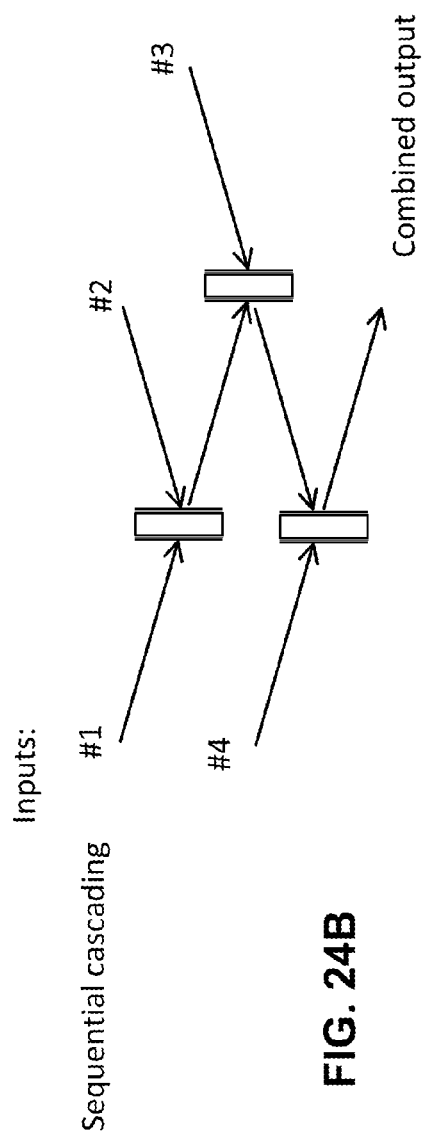

By cascading such FPI based combiners into a "binary tree" type of arrangement one can combine an arbitrary number of beams/signals. FIGS. 24A and 25B show examples of such cascading arrangements, wherein FIG. 24A depicts parallel cascading, and FIG. 25B depicts sequential cascading configuration. Although in these examples four beams are cascaded, it would be obvious to one skilled in the art that such configurations can include a much larger number of components.

Fulfilling the first condition with such resonators, however, is practically limited to only very high pulse repetition frequencies $\Delta v_r = \Delta v_{FSR}$. Indeed, according to equation (21) above, for an FPI with n=1 its thickness for $\Delta v_{FSR}$=1 GHz is d=15 cm, for $\Delta v_{FSR}$=10 MHz is d=15 m, and for $\Delta v_{FSR}$=10 kHz is d=15 km. Clearly, combiner thickness larger than ~10 m is not feasible in practical systems. For reducing practically achievable $\Delta v_{FSR}$, and thus to increasing achievable pulse energies with the $N^2$ combining an additional inventive step is required: these combining resonators should contain materials that would be capable of slowing down the light. A variety of slow-light structures are currently known. For example, a nonlinearly induced electromagnetic transparency has been demonstrated to slow down the group velocity of the propagating light down to few ~10's of meters per second. Slowing down of light group velocities is also possible with passive structures, one example of which could be a photonic-crystal (PC) structure, which is characterized by a complex photonic band structure consisting of transmission bands (corresponding to optical wavelengths that can propagate in the structure without loss) and band-gaps (where propagation of light is prohibited). It is well known that in the transmission band in the vicinity of the band-gap edge, light dispersion characteristics $\omega(k)$ becomes nearly parabolic function of propagation constant k, as provided in equation (24) and (25), where $\omega_0$ and $k_0$ are photonic band-gap edge angular frequency and the corresponding k-constant value for this edge. For simplicity we use one dimensional expressions here for one-dimensional photonic crystals, but generalization to 2D and 3D is well known in the literature.

$$\omega \approx \omega_0 + a(k - k_0)^2 \quad (24)$$

$$a = \frac{1}{2} \frac{d^2 \omega}{dk^2} \bigg|_{k=k_0} \quad (25)$$

By considering a FPI with such a photonic crystal filling the space between its mirrors one can show that such PC resonator's free-spectral range may be represented by equation (26).

$$\Delta v_{FSR}^{PC} = \frac{\frac{d\omega(k)}{dk}}{2 \cdot d} = \frac{v_g}{2 \cdot d} \quad (26)$$

Here the first order derivative of the frequency vs propagation constant is equal to the electromagnetic-wave group velocity $v_g$. Since in the photonic transmission band in the vicinity of band edge (where the band is approximately parabolic, as described above) this group velocity is provided as equation (27).

$$v_g = \frac{d\omega(k)}{dk} \approx 2a(k - k_0) \quad (27)$$

This shows that in the photonic transmission band $v_g \to 0$ when approaching the band-gap edge. Consequently, in principle it should be always possible to slow down the group-velocity of light so that any $\Delta v_r$ could be accommodated over, at least, a limited range of optical frequencies, i.e. limited bandwidth of the combined pulse spectral bandwidth $F\{A_0(t)\}$.

An example of a practical implementation of the $N^2$ combining as conducted by the inventor is now described.

The $N^2$ combining is a coherent-combining approach where all amplified signals arriving at the SHG combiner are phase locked, and that each amplified signal is suitably phase-modulated. This is accomplished with a proper channel-phasing and phase-modulating electronics, linked with the feedback-detectors and phase-modulators. The inventor demonstrated the basic electronics components and their operation in several phase-locked fiber CPA array experiments, as well as in, a prototype two-channel fiber-amplifier $N^2$ combining test system.

Figure 17:
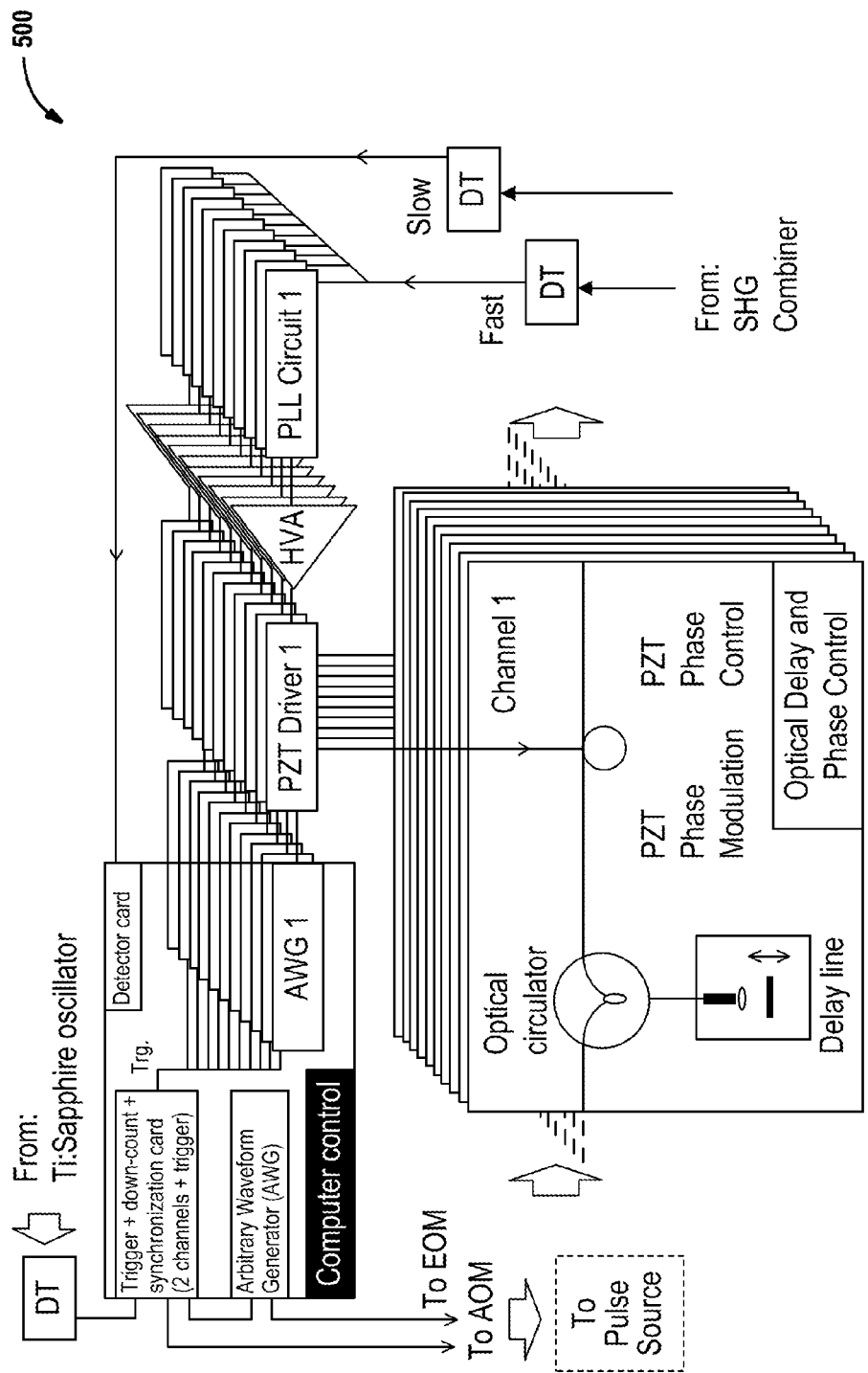
FIG. 17 is a schematic of an electric system.

FIG. 17 shows an example of an electronics system 500 and its integration with the fiber-amplifier array. All ten channels are using identical electronics. All the timing and signal control is implemented through a computer controlled system.

An example of an implementation of the phase locking is now described. The optical phase in the channels is controlled using fiber piezo-stretchers (Optiphase, PZ1). The maximum phase shift of the device is $384\pi$ at 500 V. The modulation bandwidth of the PZT devices is up to 50 kHz, sufficient to also be used for phase-modulation for single-encoding of each channel. The advantage of these modulators is their robustness, compactness, compatibility with the fiber amplifier path and ability to handle substantial average powers without any optical-power induced phase drift.

A single detector provides feedback signal to each of the feedback electronic units. This is possible because of the implementation of the self-referenced LOCSET technique for active coherent beam combining. The principle of this technique is to modulate each phase controlled channel with a unique radio frequency (RF) value to allow for phase tracking of all channels with only one detector. This approach may be modified to utilize the fact that each channel is already phase-modulated in $N^2$ combining, eliminating the need for redundant modulation of the LOCSET scheme.

Pulse combining places stringent demands on equalizing the optical path lengths of different channels. A mismatch of 1 mm in fiber length leads to about 5 ps in timing delay. In order to overlap the pulse envelopes from different channels accurately in time a simple and compact adjustable fiber-optical delay lines were constructed by the inventor by utilizing the non-reciprocal nature of a fiber circulator and standard fiber-optic components. The delay line works as follows: an input pulse is sent into port 1 of a circulator, it then travels out of port 2 (a fiber collimator is spliced onto this port), and in free space propagates over a variable length (i.e. the delay) before retro-reflected back into port 2 with a micro-optic mirror. The delayed pulse comes out of port 3 of the circulator. The insertion loss of this delay line is about 6 dB and therefore it is placed before the amplification stages in each parallel channel.

To implement $N^2$ combining scheme it is recommended to imprint a suitable phase-coded modulation onto the each-channel signal, as described earlier. Electronically this modulation is produced by arbitrary waveform generator cards, controlled by a computer, as shown in the schematics of FIG. 17. The experiments conducted with the prototype two-channel $N^2$ combining system demonstrated that the procedure for setting the correct modulating patterns is relatively straightforward. Its detail of operation can be summarized as follow. The main approach is that the modulation errors are detected with a slow detector at the combined beam at the system output in an operation mode when the adjusted channel is modulated at a particular frequency (used only during phase-modulation alignment) to identify the effect of this specific channel. If the modulation amplitude or other characteristics are not correct, the slow detector observes the combined-power modulation associated with this modulation frequency. The procedure of setting the correct modulation reduces to minimizing and eventually to eliminating this beat signal. After this the procedure can be repeated for each of the channels. What is practically important is that this procedure is completely independent from the phase-locking and its errors, and can be done for each channel separately. After the modulation-signal is set there is no need to track the modulation, since it is not related to the phasing-errors due to random refractive-index drifts in the optical path.

A preliminary experimental demonstration of two-channel $N^2$ combining system operation conducted by the inventor is described next.

The inventor performed an initial demonstration of the $N^2$ combining in the two-channel parallel amplifier system in the laboratory. The system was actually a two-channel single-mode fiber CPA, seeded with 1 ns stretched optical pulses from a mode-locked oscillator at 78 MHz. After stretching pulses were down-counted to 100 kHz using a free-space acousto-optic modulator and then coupled into a common pre-amplifier chain. After this the signal was split with a PM fiber 50:50 splitter into two parallel amplification channels with the above described fiber-optic adjustable-delay, phase-control and phase-modulation optical components in its path. In this setup phase control for coherent phasing between the channels was implemented using PZT fiber stretcher and for phase-modulation encoding we used fast $LiNbO_3$ phase modulators.

Figure 18:
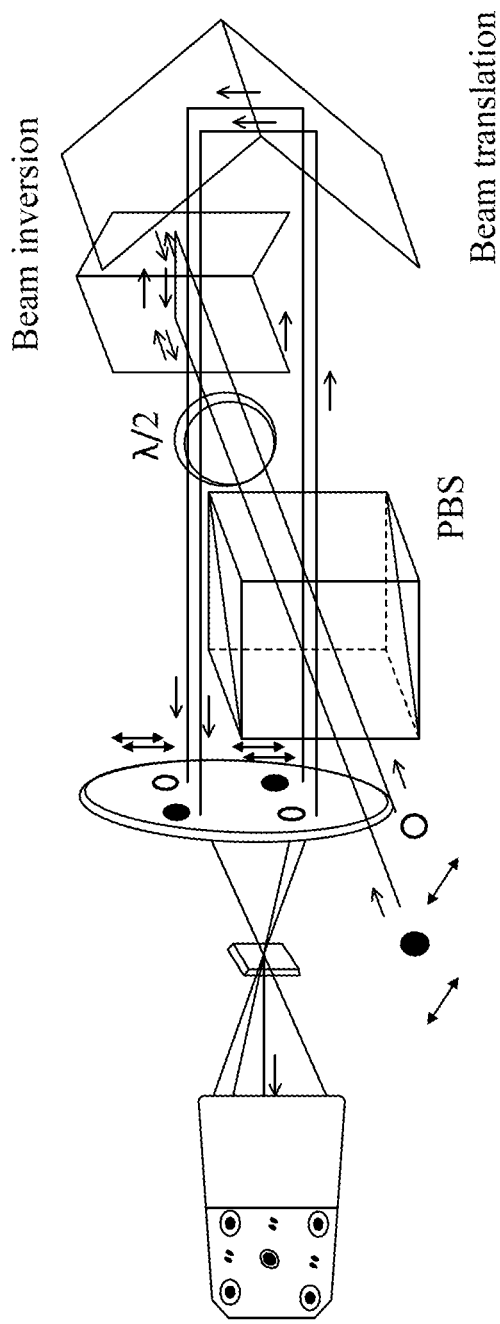
FIG. 18 is a schematic of an experiment conducted by the inventor.

Arrangement for experimental demonstration of beam splitting and stacking for this two-channel system is shown in FIG. 18. The experimentally tested prototype non-collinear SHG beam combining setup for demonstrating $N^2$ combining with two parallel fiber-amplification channels includes beam splitting and stacking arrangement. A schematic on the left illustrates the observed SH and pump beam pattern at the output of the Type I BBO SHG combiner. Beams at the input are polarized at 45-degrees, at the output they are vertically polarized.

The following points have been verified.

Experimental implementation and operation of the simultaneous operation of the phase-locking and phase-modulation.

Established experimental procedures for tracking phasing errors and for the accurate control of the phase-modulating signals.

Experimentally demonstrated the proposed beam-splitting and stacking design. For this the inventor built a simplified version for producing only two beam pairs, as illustrated in FIG. 18. In this system two beams from the fiber amplifier output, which are identified in FIG. 18 by full and empty circles, were launched into the basic setup consisting of a PBS and two right-angle mirror-set arrangements to achieve beam-pair horizontal inversion and vertical translation to produce the required symmetric 2-pair beam pattern at the output of the arrangement. The two beam pairs were forming two diagonals of a square beam pattern. Polarizations of each beam is also shown.

Combining was demonstrated using the non-collinear Type-I SHG in a 0.1 mm thick BBO crystal. Formed rectangular beam pattern at the output of splitting/stacking arrangement was focused into 300 µm diameter focal spot in this crystal at $\theta_{pm}=24°$. The observed output-beam pattern at the output of the SHG combiner is shown in the upper right-hand corner of FIG. 18. It consists of the central combined green beam at 532 nm and the four symmetric residual pump beams at 1064 nm, detected with an IR card. The inventor had verified that combined beams were completely spatially and direction overlapped. Also verified that each beam and each beam-pair contributed to the SHG signal equally.

Figure 19:
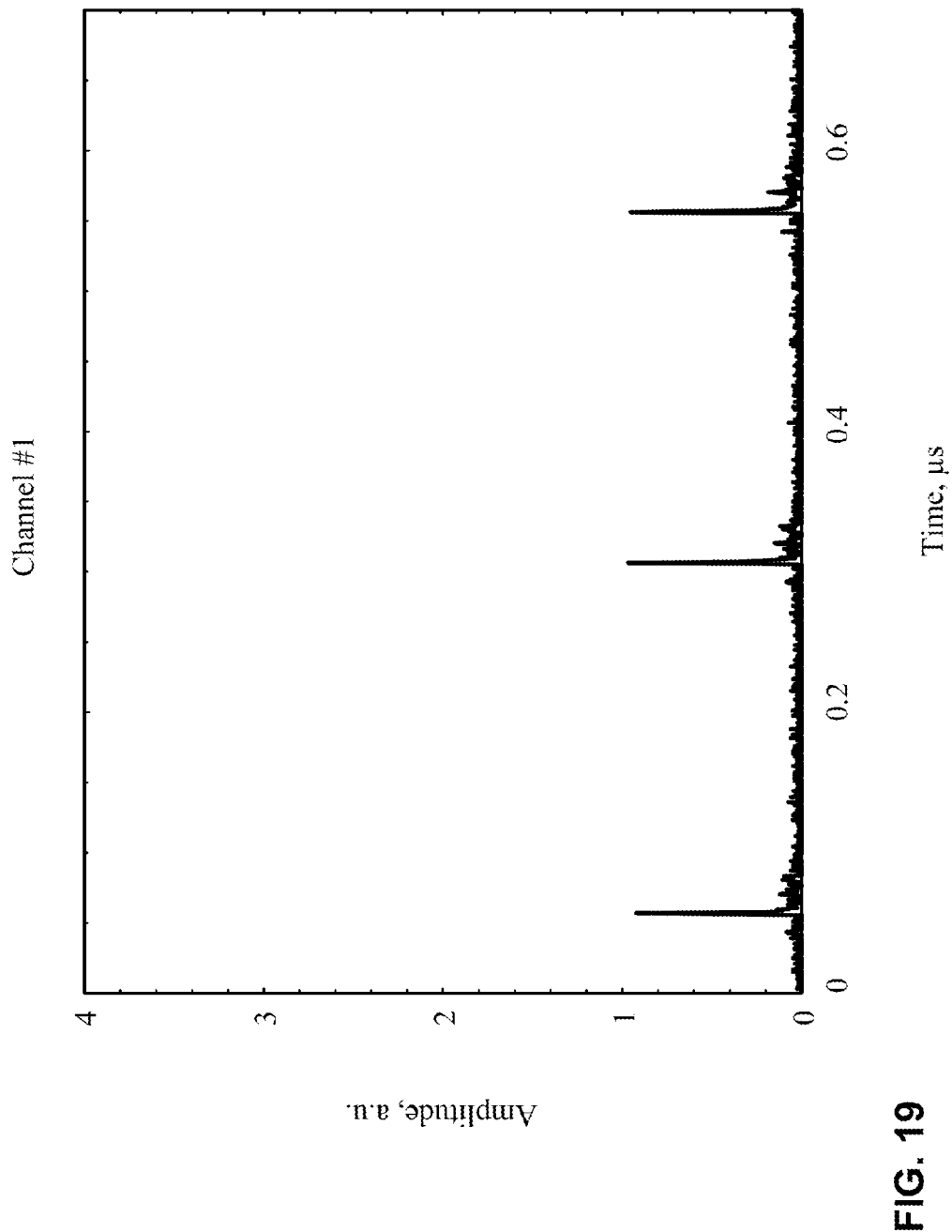
FIG. 19 is a graph of a channel 1 signal for the experiment conducted by the inventor.
Figure 20:
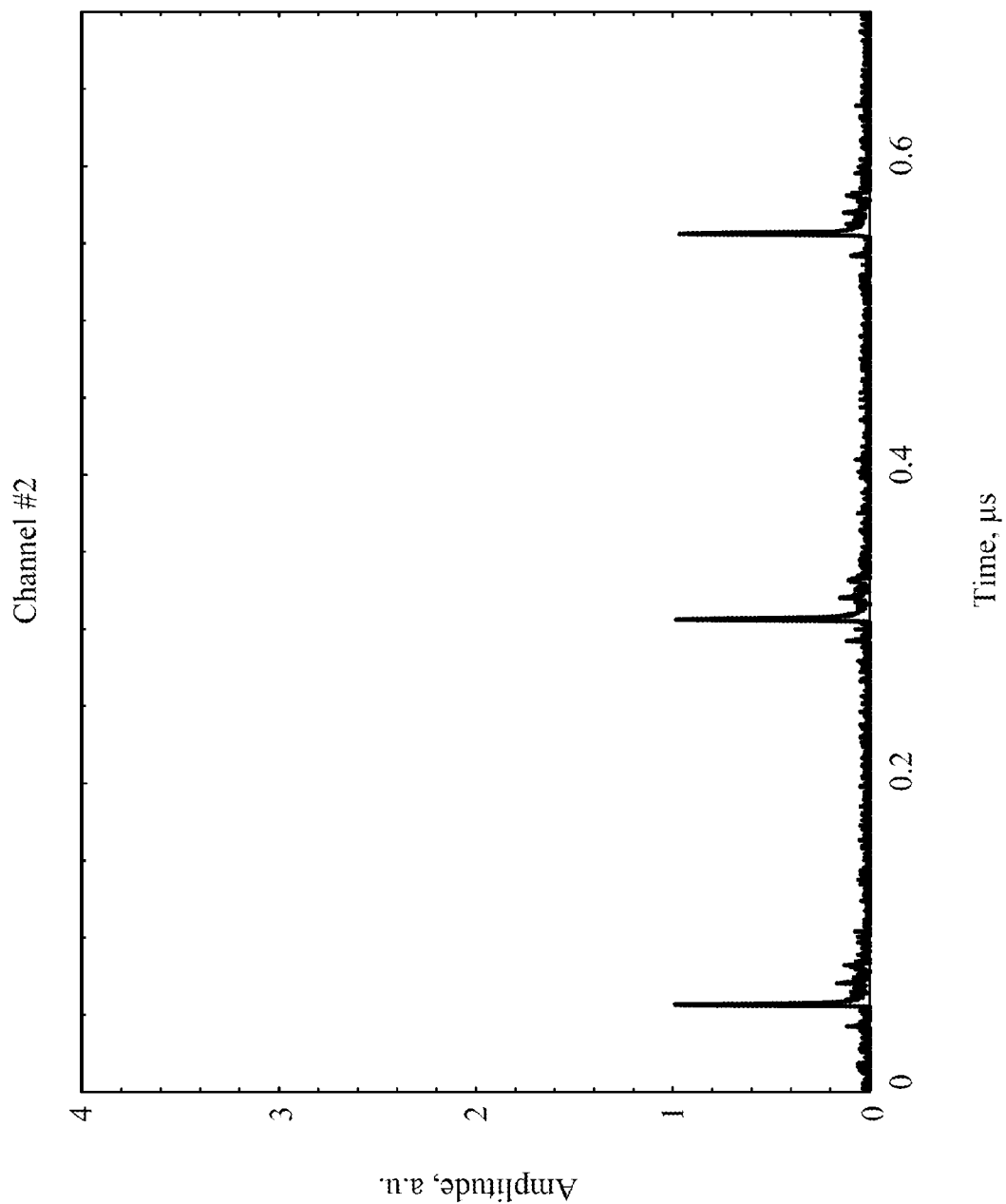
FIG. 20 is a graph of a channel 2 signal for the experiment conducted by the inventor.
Figure 21:
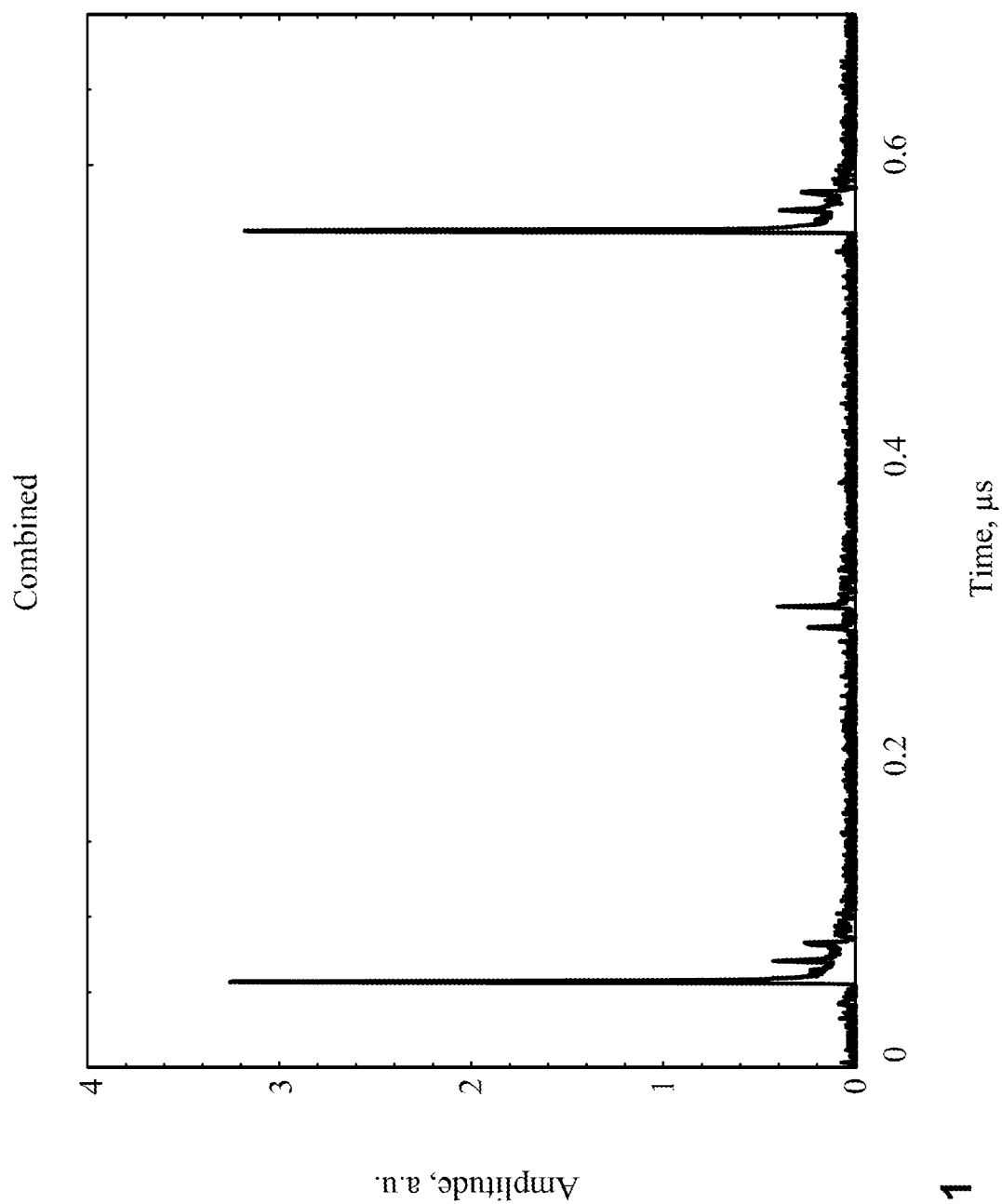
FIG. 21 is a graph of a combined signal produced by the experiment conducted by the inventor.

With the proper phase-modulation encoded into each-channel signal (using the procedure outlined earlier) the inventor had verified that the 50 kHz pulsed signal, down-counted by a factor of two from the input 100 kHz repetition rate, was indeed achieved, as shown in FIGS. 19, 20, 21.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for increasing energy in a pulse optical beam, comprising:
   receiving an optical input beam having a periodic pulse train with a given repetition frequency;
   splitting the input beam into N optical signals;
   phase modulating each signal in the N optical signals at a different prescribed phase, such that the N optical signal are orthogonal to each other; and
   coherently combining each of the phase modulated signals into a single optical output beam by actively correcting phase errors in each of the phase modulated signals, where a phase error is measured between phase of a given phase modulated signal and a corresponding prescribed phase for the given phase modulated signal.

2. The method of claim 1 wherein phase modulating further comprises applying a linear-phase ramp modulating signal to each of the N optical signals.

3. The method of claim 1 wherein phase modulating further comprises applying a staircase-shaped phase modulating signal to each of the N optical signals.

4. The method of claim 1 wherein phase modulating further comprises shifting a frequency of each longitudinal mode in a frequency comb of a given signal, m, in the N optical signals by a spacing equal to $\Delta\omega m/N$, where $\Delta\omega$ is an angular repetition rate of the period pulse train, m is an integer selected from zero to N−1, and N is the number of optical signals.

5. The method of claim 1 wherein phase modulating further comprises selecting a phase modulation pattern for the N optical signals using a Hadamard matrix.

6. The method of claim 1 further comprises amplifying each of the phase modulated signals in the N optical signals prior to coherently combining the phase modulated signals.

7. The method of claim 6 further comprises phase locking each signal of the N optical signals prior to amplifying the respective signal, wherein the phase locking is implemented using a phase controller.

8. The method of claim 1 wherein coherently combining further comprises using a nonlinear optical conversion method.

9. The method of claim 8 wherein the nonlinear optical conversion method is selected from one of second-harmonic generation, sum-frequency generation and difference-frequency generation.

10. The method of claim 1 wherein the optical input beam is comprised of multiple continuous wave beams having different optical frequencies.

11. The method of claim 1 wherein coherently combining further comprises linearly combining each of the phase modulated signals using an array of Fabry-Perot interferometers.

12. A method for increasing energy in a pulse optical beam, comprising:
    receiving an optical input beam having a period pulse train with a given repetition frequency;
    splitting the input beam into a plurality of optical signals;
    phase-modulating each signal in the plurality of optical signals at a different phase, such that the plurality of optical signal are orthogonal to each other;
    amplifying each of the phase-modulated signals in the plurality of optical signals; and
    coherently combining each of the plurality of optical signals into a single optical output beam using second-harmonic generation.

13. The method of claim 12 wherein phase modulating further comprises applying a linear-phase ramp modulating signal having a slope of $2\pi m/N\Delta T$ to each of the plurality of optical signals, where N is the number of optical signals, m is an integer selected from zero to N−1, and T is a reception period of the periodic pulse train.

14. The method of claim 12 wherein phase modulating further comprises applying a staircase-shaped phase modulating signal to each of the plurality of optical signals.

15. The method of claim 12 wherein phase modulating further comprises shifting a frequency of each longitudinal mode in a frequency comb of a given signal, m, in the plurality of optical signals by a spacing equal to $\Delta\omega m/N$, where $\Delta\omega$ is an angular repetition rate of the period pulse train, m is an integer selected from zero to N−1, and N is the number of optical signals.

16. The method of claim 12 wherein coherently combining further comprises:
    splitting each of the plurality of optical signals into two signals having equal power, thereby forming a respective beam pair;
    forming an array of optical beams by symmetrically aligning the respective beam pairs around a common center; and
    directing the array of optical beams towards a nonlinear phase-matched crystal.

17. The method of claim 12 wherein coherently combining further comprises:
    arranging the plurality of optical signals in a semi-circular shape to form a semi-optical array input;
    splitting the semi-optical array input into two beams having equal power;
    inverting one of the beams in a first direction and the other beam in a second direction, wherein the first direction and the second direction are orthogonal to each other;
    joining the two inverted beams into a full-optical beam having the two beams positioned on opposite side of the full-optical beam; and
    combining the full-optical beam array into the single optical output beam.

18. A system for increasing energy in a pulse optical beam, comprising:
    a splitter configured to receive an optical input beam having a periodic pulse train with a given repetition frequency and operates to split the optical input beam into N optical signals;
    a plurality of phase modulators, each phase modulator in the plurality of phase modulators is configured to receive one of the N optical signals from the splitter and operates to phase modulate the received optical signal at a given phase, such that the phase modulated signals output by the plurality of phase modulators are orthogonal to each other;
    a plurality of amplifiers, each amplifier in the plurality of amplifiers is configured to receive one of the phase modulated signals and operates to amplify the phase modulated signal; and
    an optical combiner configured to receive each of the phase modulated signals from the plurality of amplifiers and operate to coherently combine each of the phase modulated signals into a single optical output beam.

19. The system of claim 18 wherein the optical combiner is further defined as a nonlinear optical crystal.

20. The system of claim 19 wherein the optical crystal is comprised of barium borate.

21. The system of claim 19, wherein the optical combiner further comprises:
- a beam splitter configured to split each of the N optical signals into two signals having equal power, such that two beam arrays each having N optical signals with equal power are outputted; and
- a first inverting mirror and a second inverting mirror, the first inverting mirror configured to invert one beam array in a first direction, and the second inverting mirror configured to invert the other beam array into a second direction orthogonal to the first direction, and
- the optical crystal is a second harmonic generation type of crystal that combines the two beam arrays into the single optical output beam.

22. The system of claim 18, wherein the optical combiner is further defined as an array of Fabry-Perot interferometers.

\* \* \* \* \*